(12) United States Patent
Park et al.

(10) Patent No.: US 11,985,082 B2
(45) Date of Patent: May 14, 2024

(54) METHOD FOR REPORTING CHANNEL STATE INFORMATION ACCORDING TO DRX MODE OPERATION IN WIRELESS COMMUNICATION SYSTEM, AND DEVICE FOR SAME

(71) Applicant: LG ELECTRONICS INC., Seoul (KR)

(72) Inventors: Haewook Park, Seoul (KR); Jiwon Kang, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 542 days.

(21) Appl. No.: 17/278,222

(22) PCT Filed: Sep. 23, 2019

(86) PCT No.: PCT/KR2019/012369
§ 371 (c)(1),
(2) Date: Mar. 19, 2021

(87) PCT Pub. No.: WO2020/060378
PCT Pub. Date: Mar. 26, 2020

(65) Prior Publication Data
US 2021/0351881 A1   Nov. 11, 2021

(30) Foreign Application Priority Data

Sep. 21, 2018 (KR) .................. 10-2018-0114466
Jul. 26, 2019 (KR) .................. 10-2019-0091294

(51) Int. Cl.
*H04L 5/00* (2006.01)
*H04W 24/10* (2009.01)
*H04L 27/26* (2006.01)

(52) U.S. Cl.
CPC .......... *H04L 5/0035* (2013.01); *H04L 5/0048* (2013.01); *H04W 24/10* (2013.01); *H04L 27/261* (2013.01)

(58) Field of Classification Search
CPC .... H04L 5/0035; H04L 5/0048; H04W 24/10; H04W 76/28; H04B 7/024
See application file for complete search history.

(56) References Cited

U.S. PATENT DOCUMENTS

2013/0279455 A1* 10/2013 Park .................. H04L 5/0035
   370/329
2015/0098379 A1   4/2015 Lunden et al.
(Continued)

FOREIGN PATENT DOCUMENTS

KR  10-2018-0072823 A   6/2018
WO     2013/051909 A2   4/2013
WO  WO-2020003443 A1 *  1/2020

OTHER PUBLICATIONS

3GPP TS 38.214 V15.2.0 (Jun. 2018), "3rd Generation Partnership Project; Technical Specification Group Radio Access Network; NR; Physical layer procedures for data" (Release 15), Jun. 29, 2018, See section 5.2.1.4.

*Primary Examiner* — Chae S Lee
(74) *Attorney, Agent, or Firm* — BRYAN CAVE LEIGHTON PAISNER LLP

(57) ABSTRACT

A method of reporting CSI in a COMP system by a terminal, receiving DRX configuration information from a first and a second base station; receiving first configuration information related to CSI report of a first BWP and second configuration information related to a CSI report of a second BWP from the first and the second base station, the first BWP is composed of a plurality of first subbands including at least one first subband, the second BWP is composed of a plurality of second subbands including at least one second (Continued)

subband, and the first configuration information and the second configuration information are received only during a specific time based on the DRX configuration information; and based on the at least one first subband and second subband overlapping partially or entirely, reporting a first CSI for overlapping at least one subband to the first and the second base station.

18 Claims, 18 Drawing Sheets

(56) References Cited

U.S. PATENT DOCUMENTS

| | | | |
|---|---|---|---|
| 2016/0006487 A1 | 1/2016 | Ding et al. | |
| 2019/0306915 A1* | 10/2019 | Jin | H04W 76/28 |
| 2020/0099473 A1* | 3/2020 | Han | H04L 5/0048 |
| 2021/0289535 A1* | 9/2021 | Kakishima | H04W 72/23 |

* cited by examiner

[FIG.1]
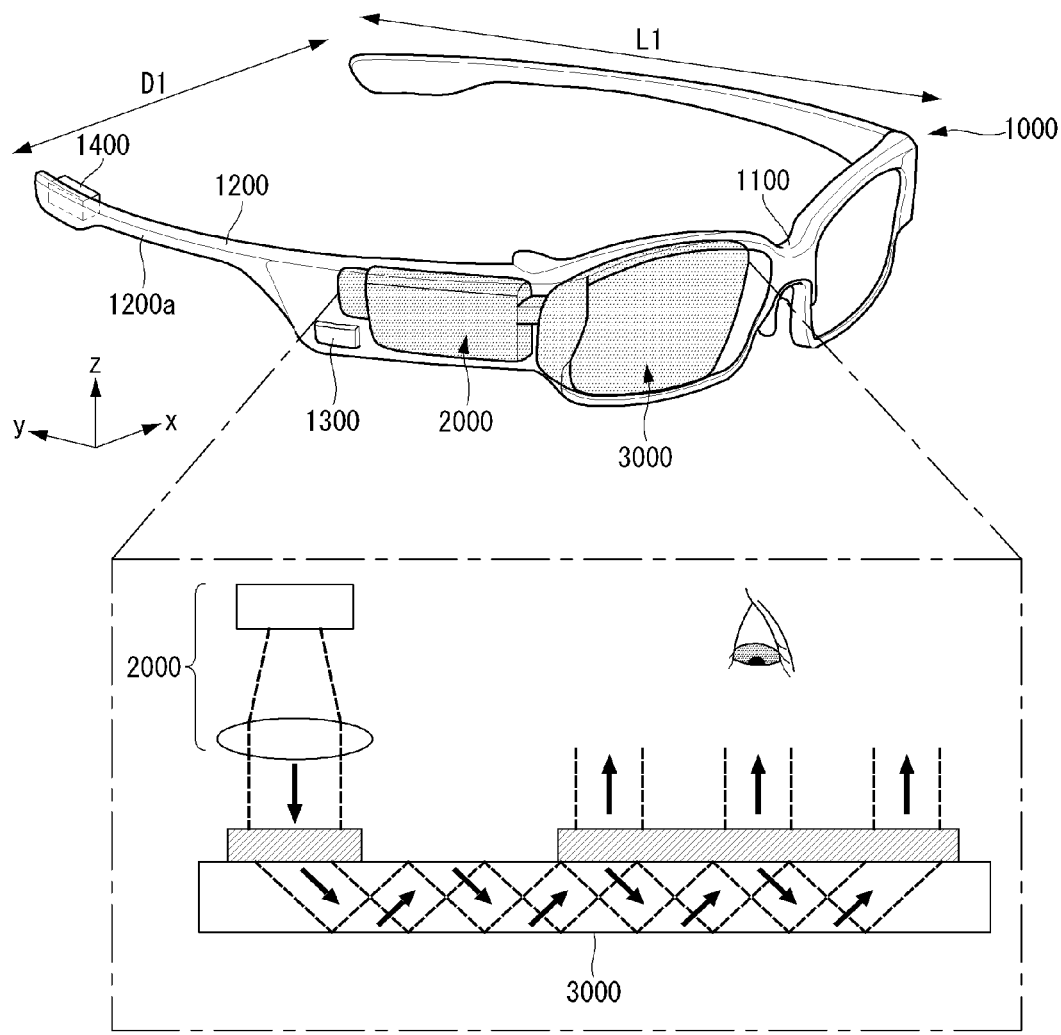

[FIG. 2]
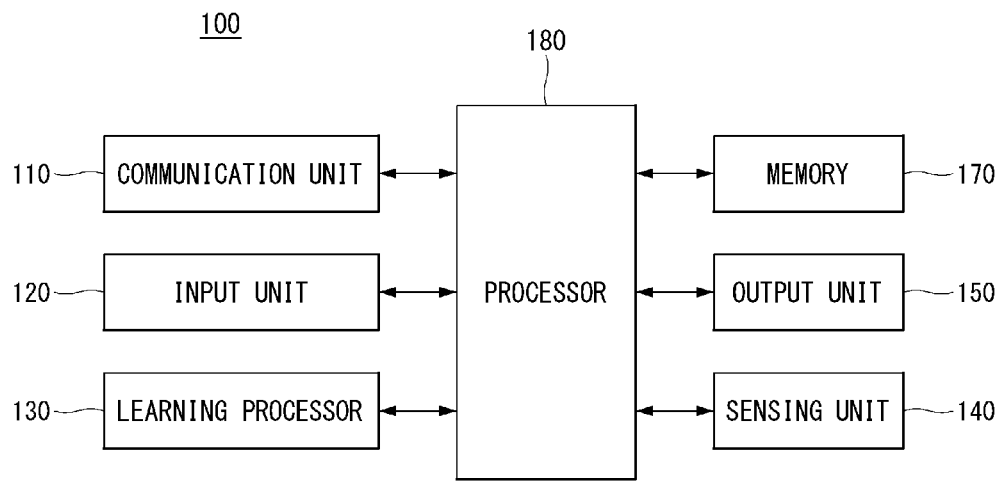
[FIG. 3]
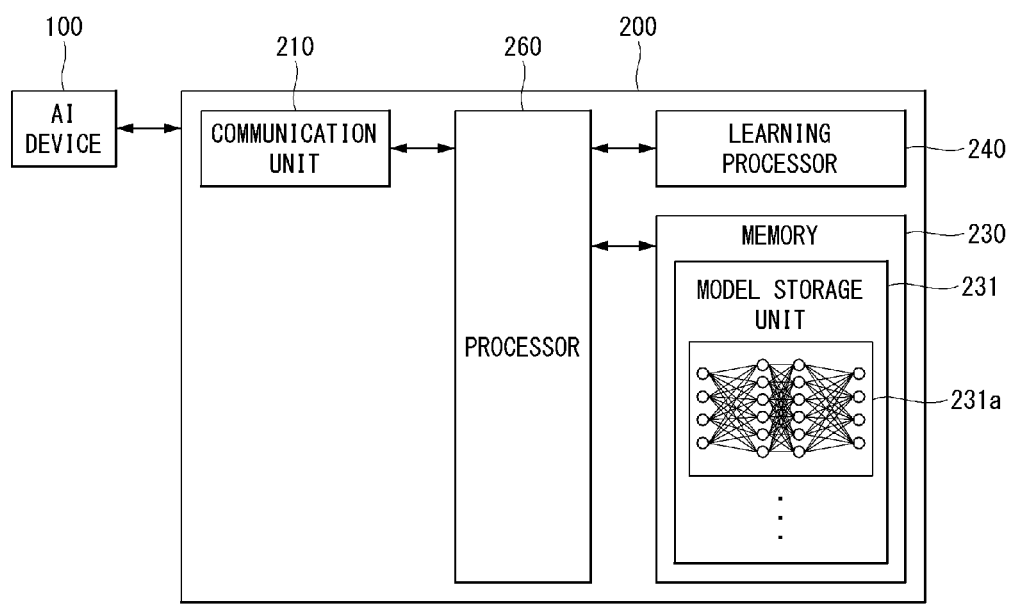

[FIG. 4]
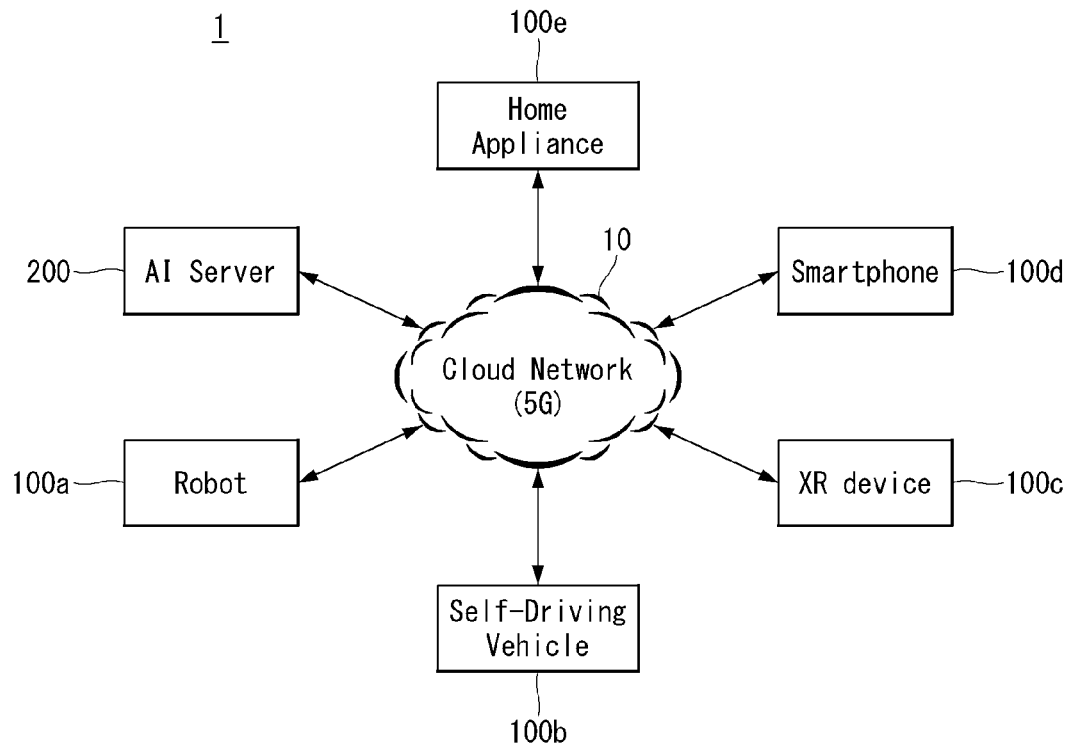
[FIG. 5]
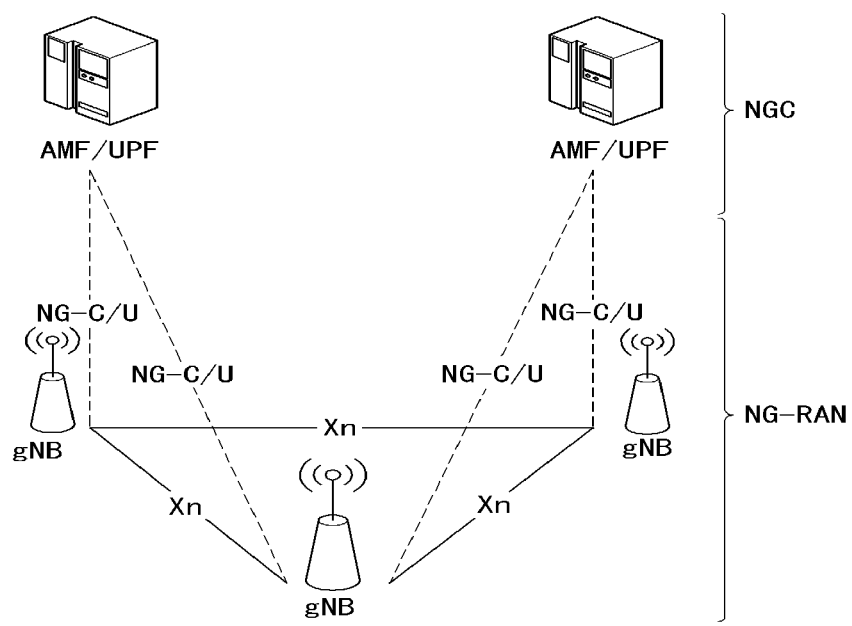

[FIG. 6]
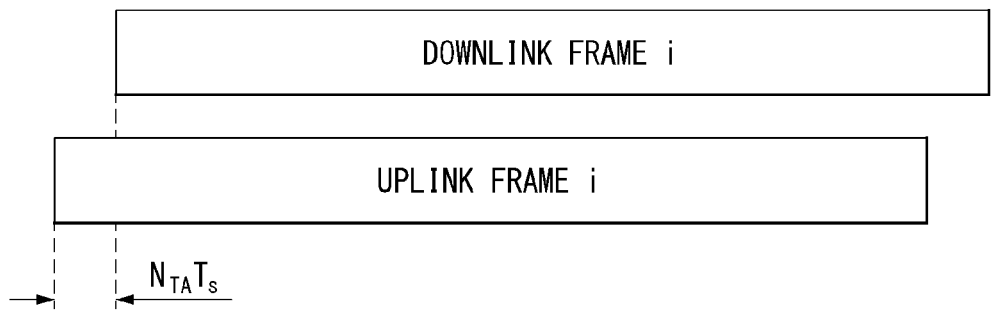

[FIG. 7]
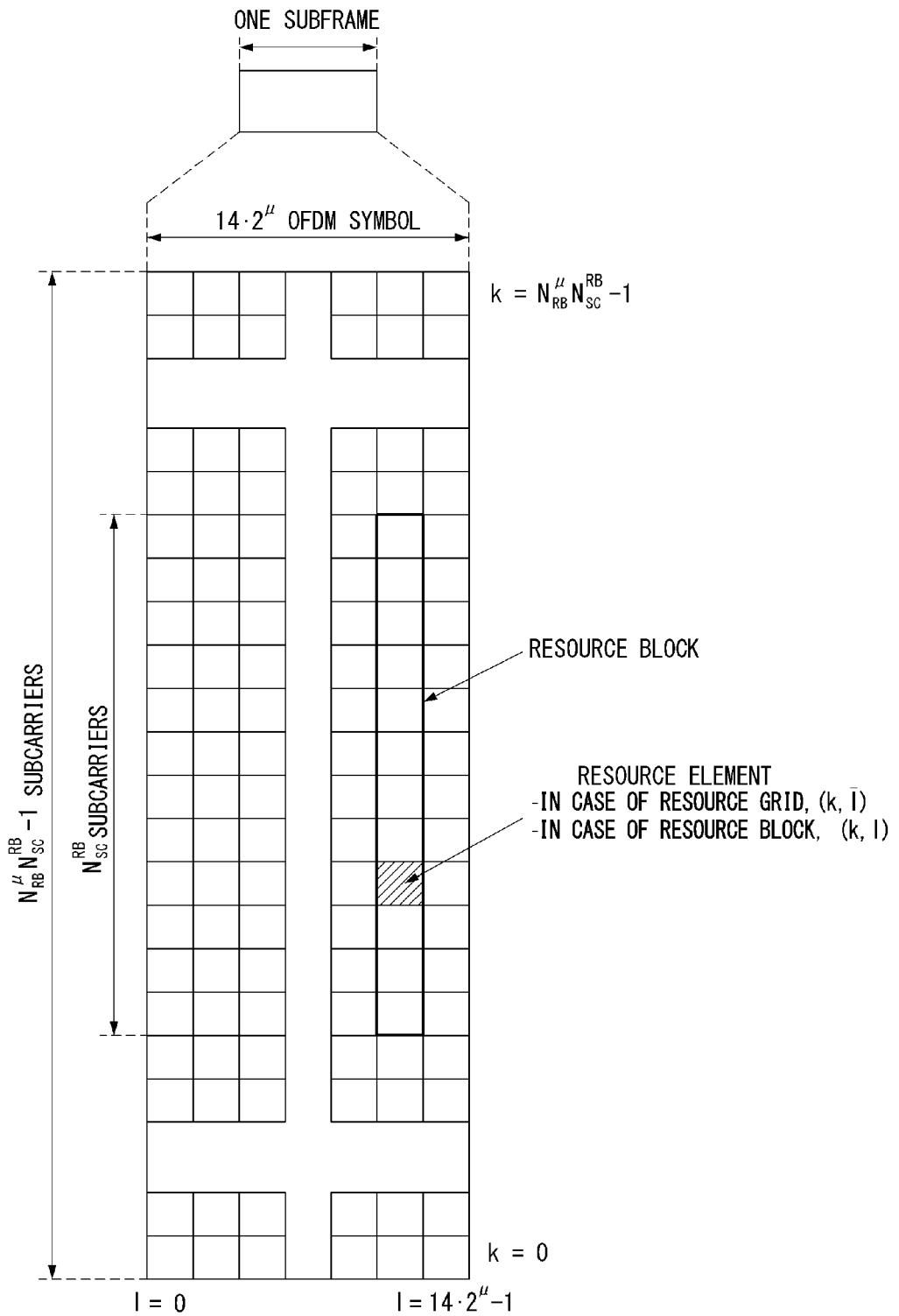

[FIG. 8]
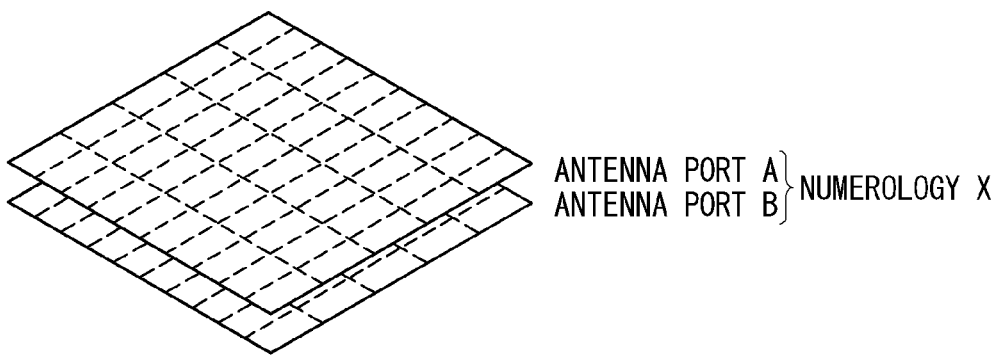
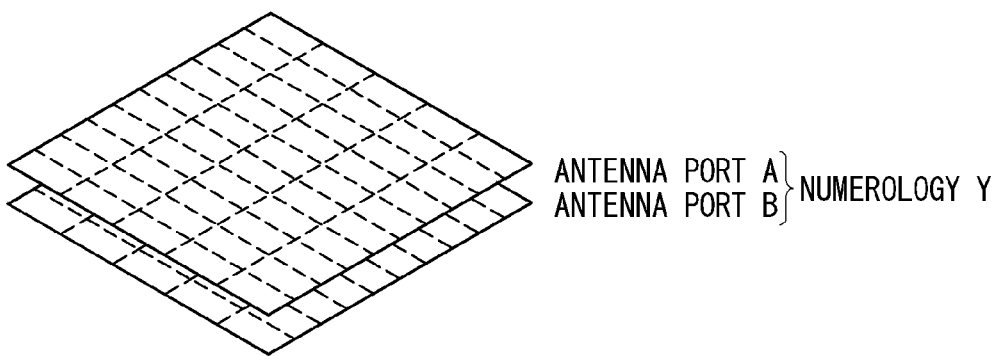

[FIG. 9]
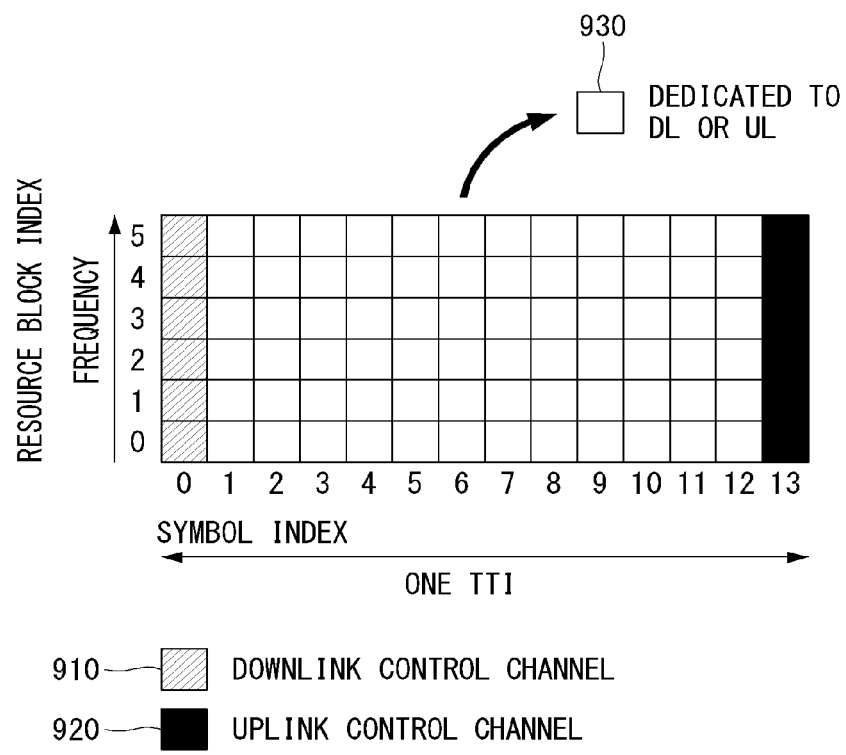

[FIG. 10]
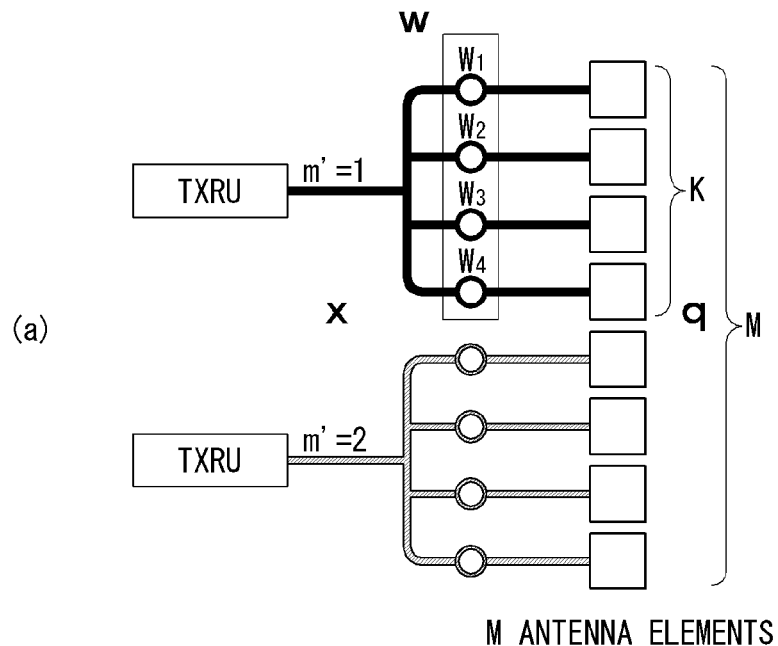
(a)
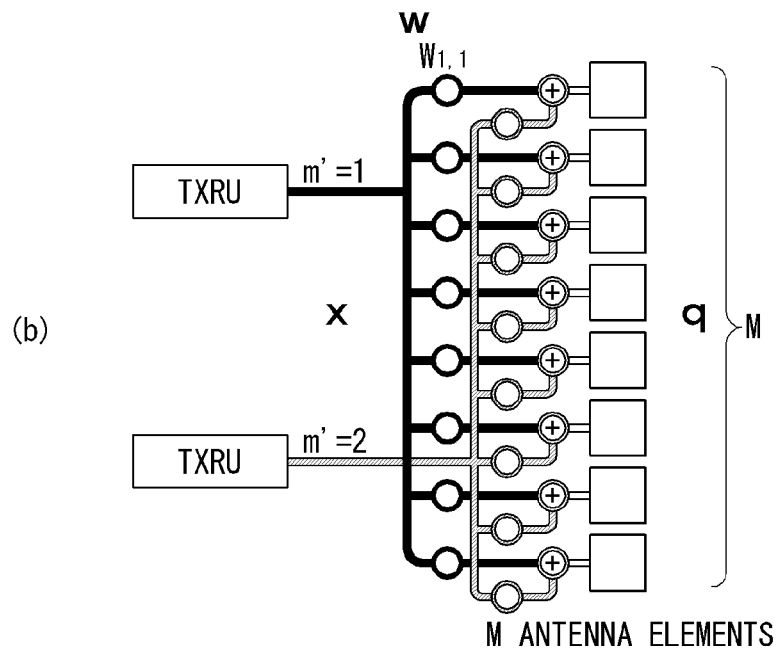
(b)

[FIG. 11]
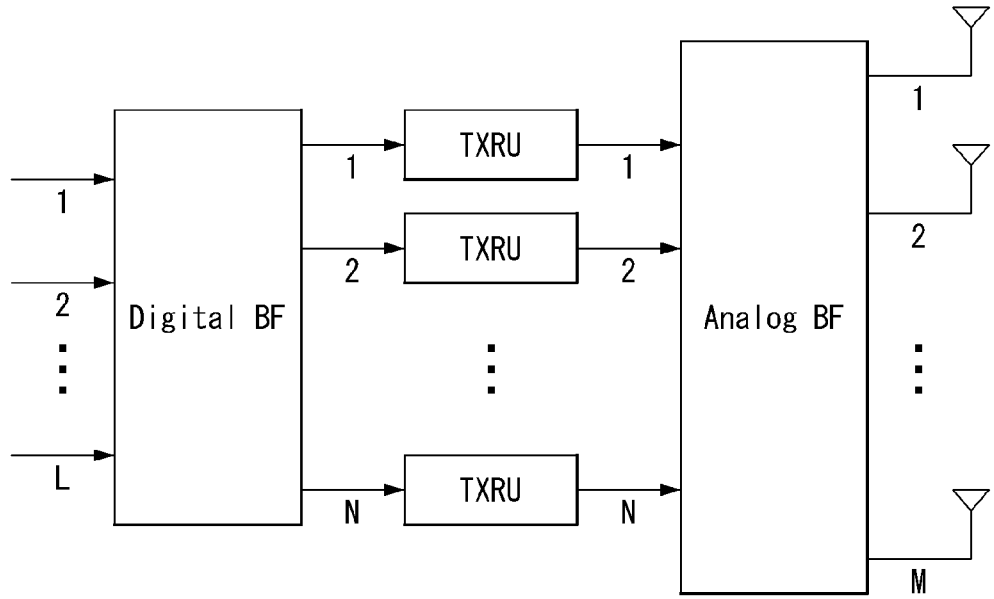
[FIG. 12]
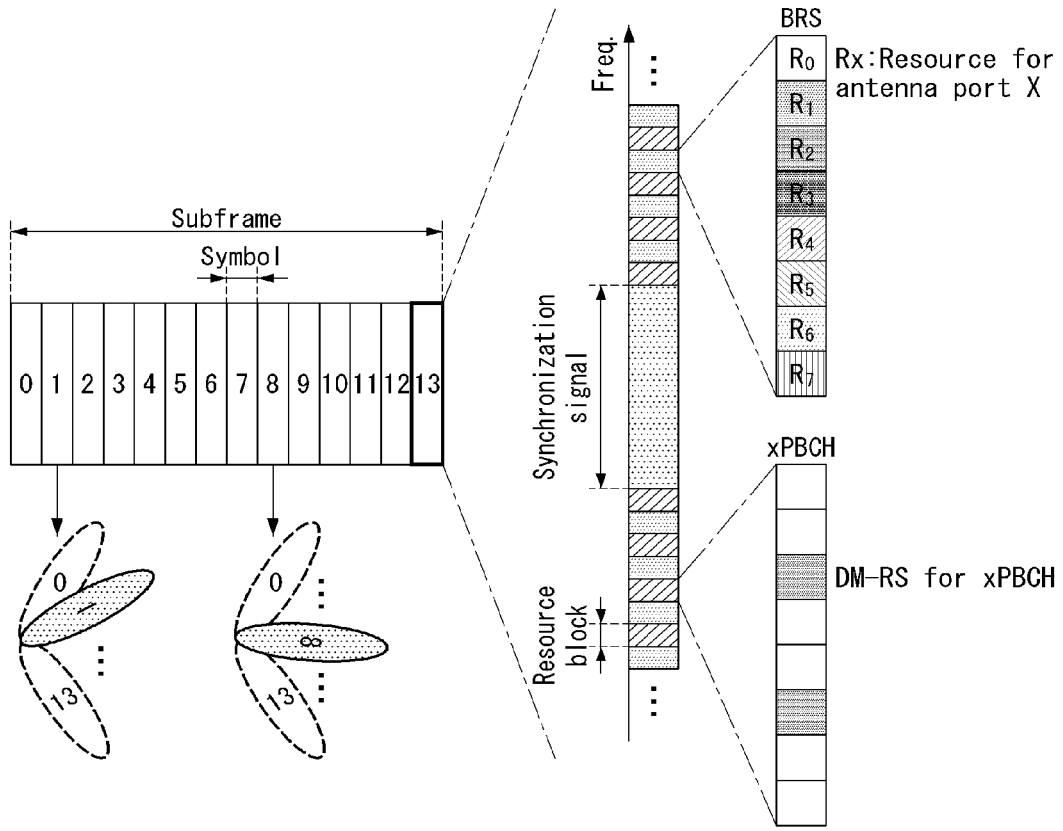

[FIG. 13]
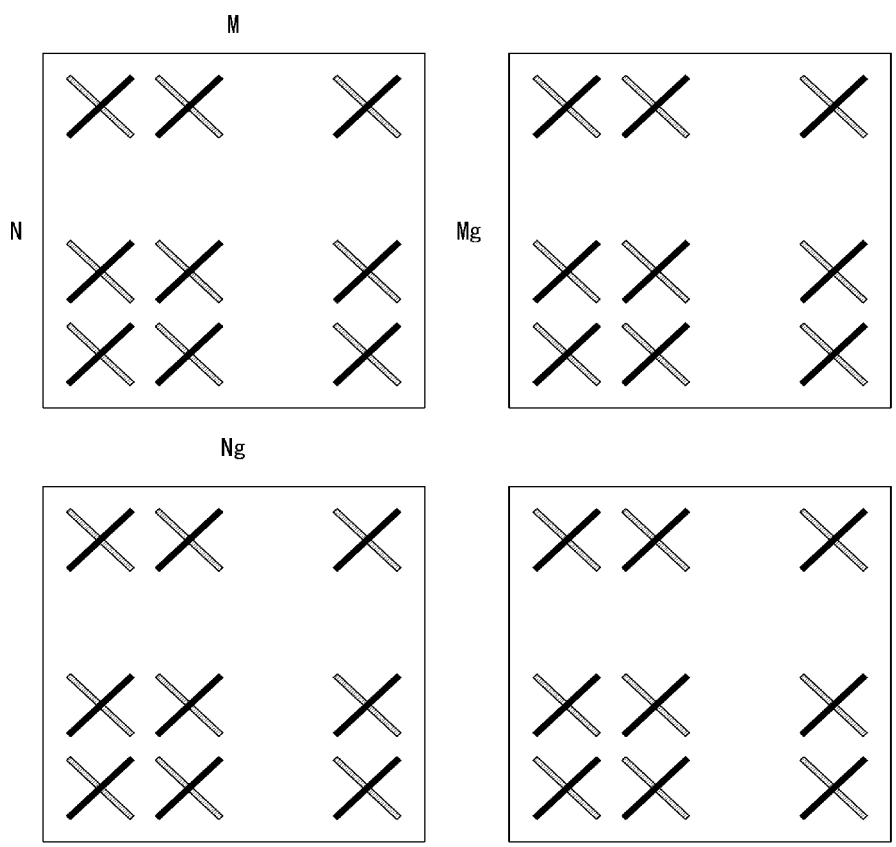

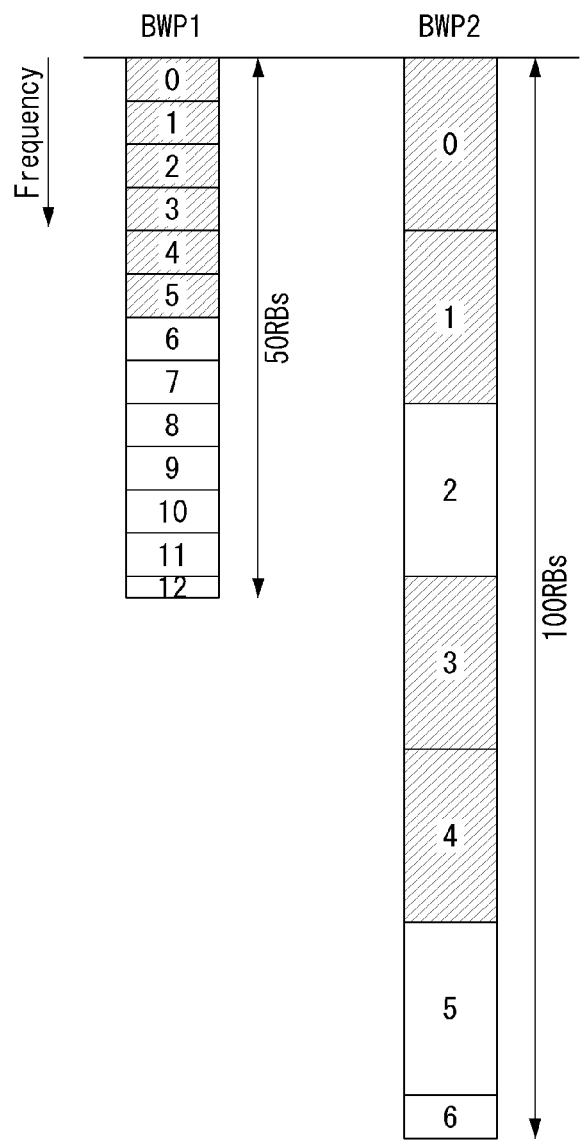
[FIG. 14]

[FIG. 15]
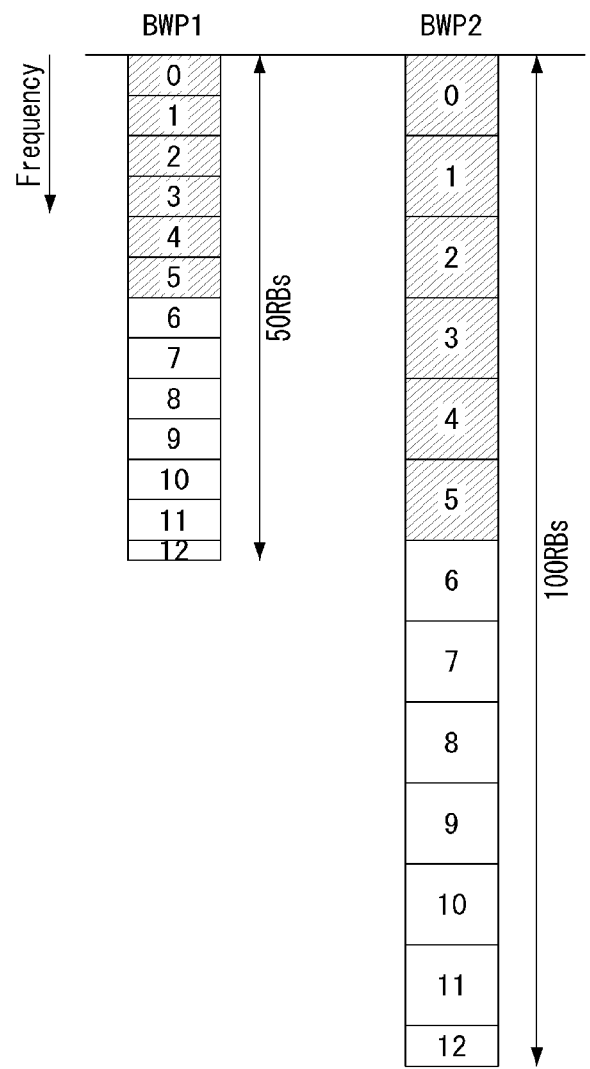

[FIG. 16]
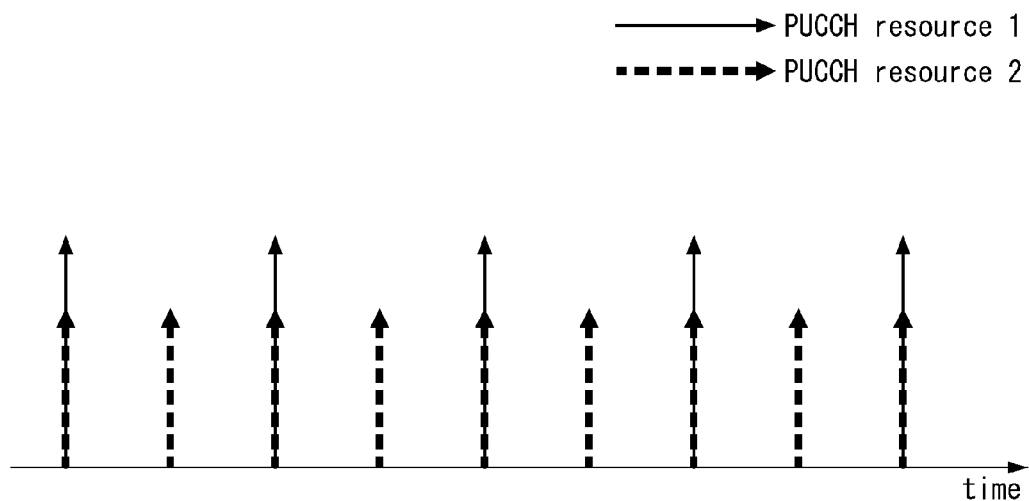
[FIG. 17]
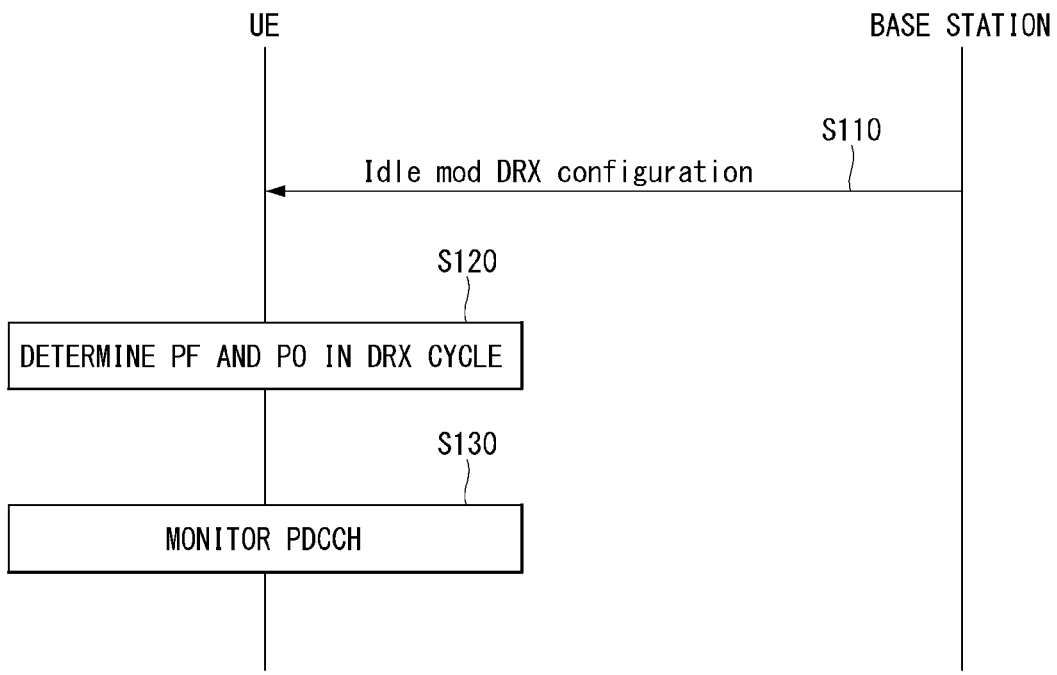

[FIG. 18]
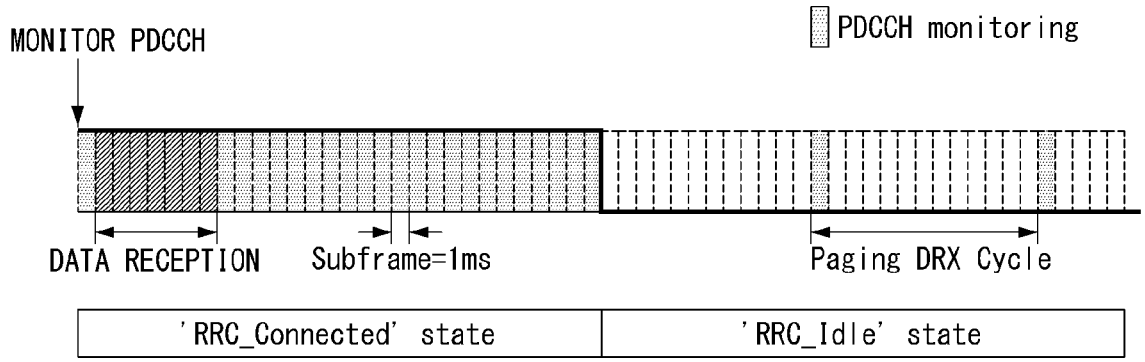
[FIG. 19]
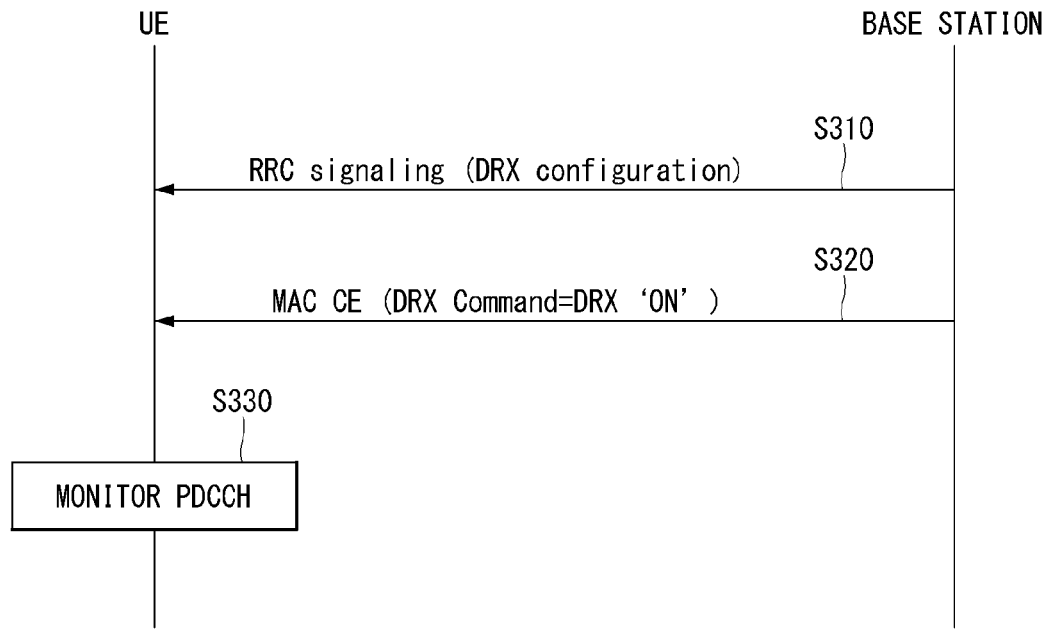

[FIG. 20]
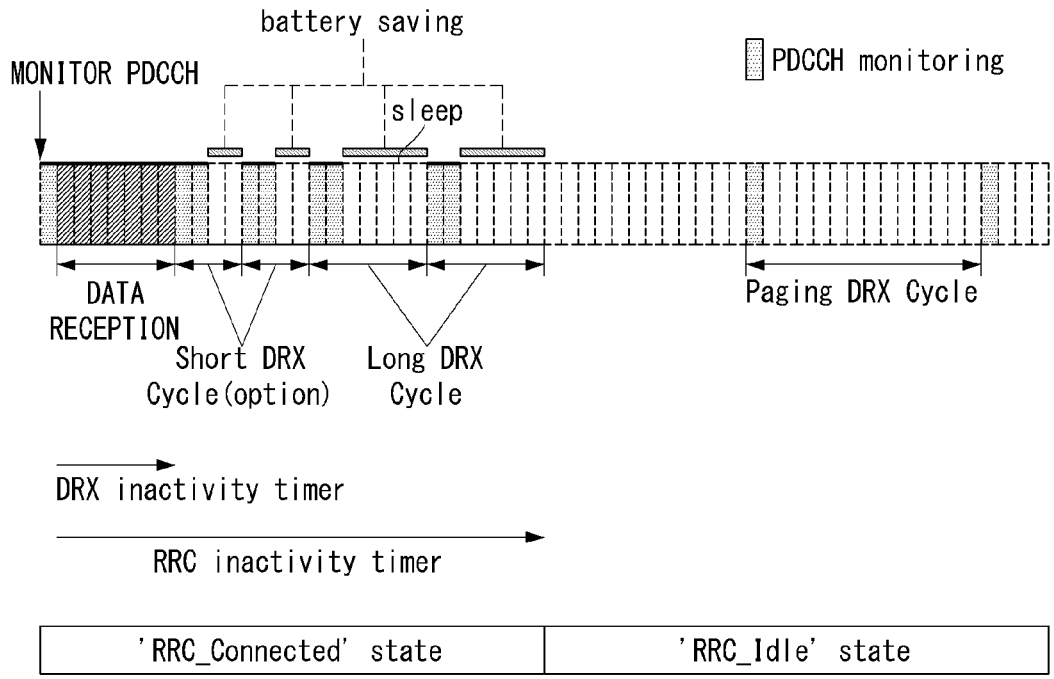
[FIG. 21]
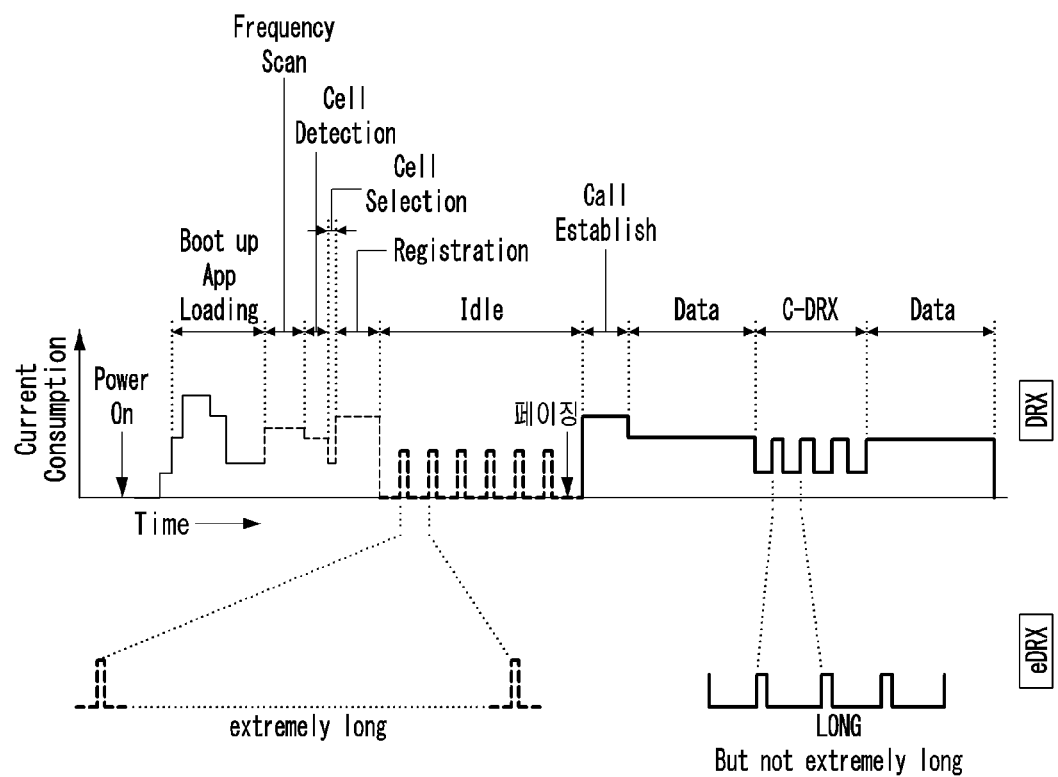

[FIG. 22]
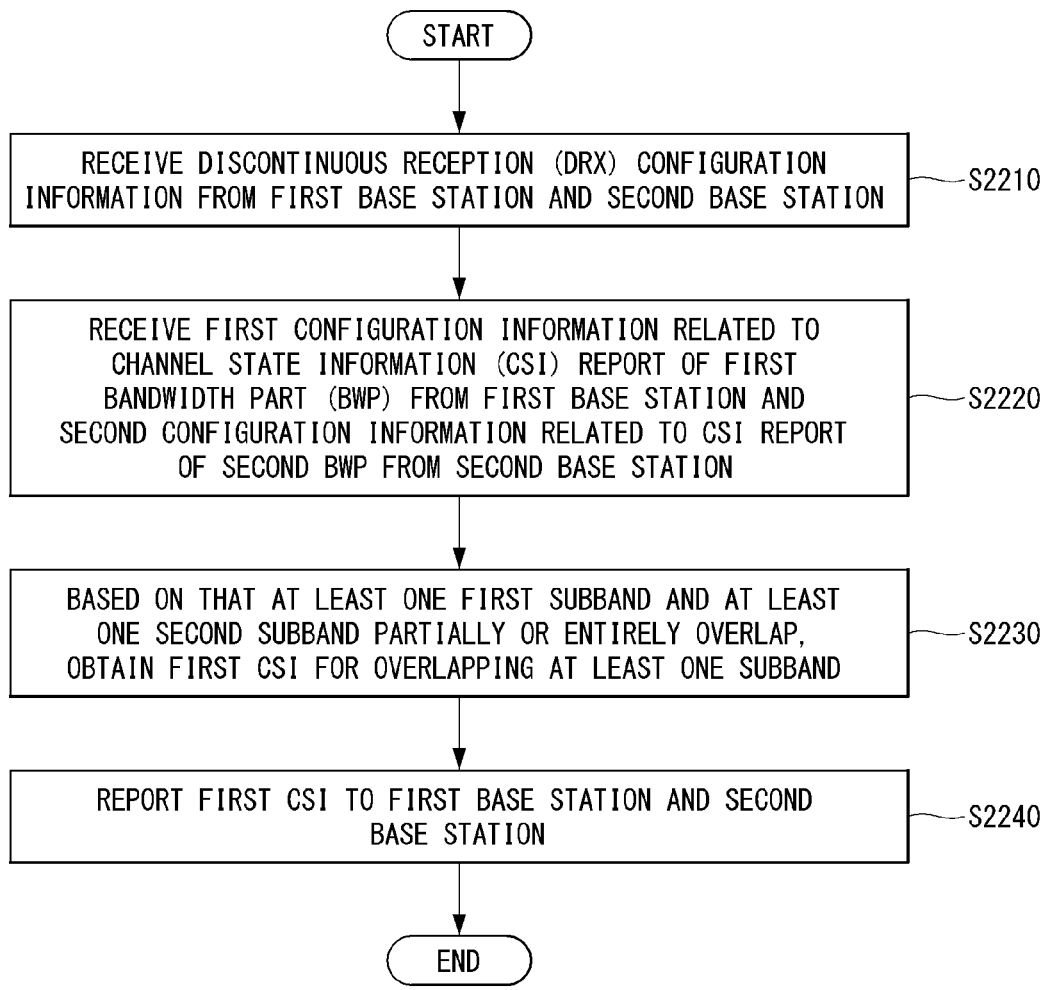

[FIG. 23]
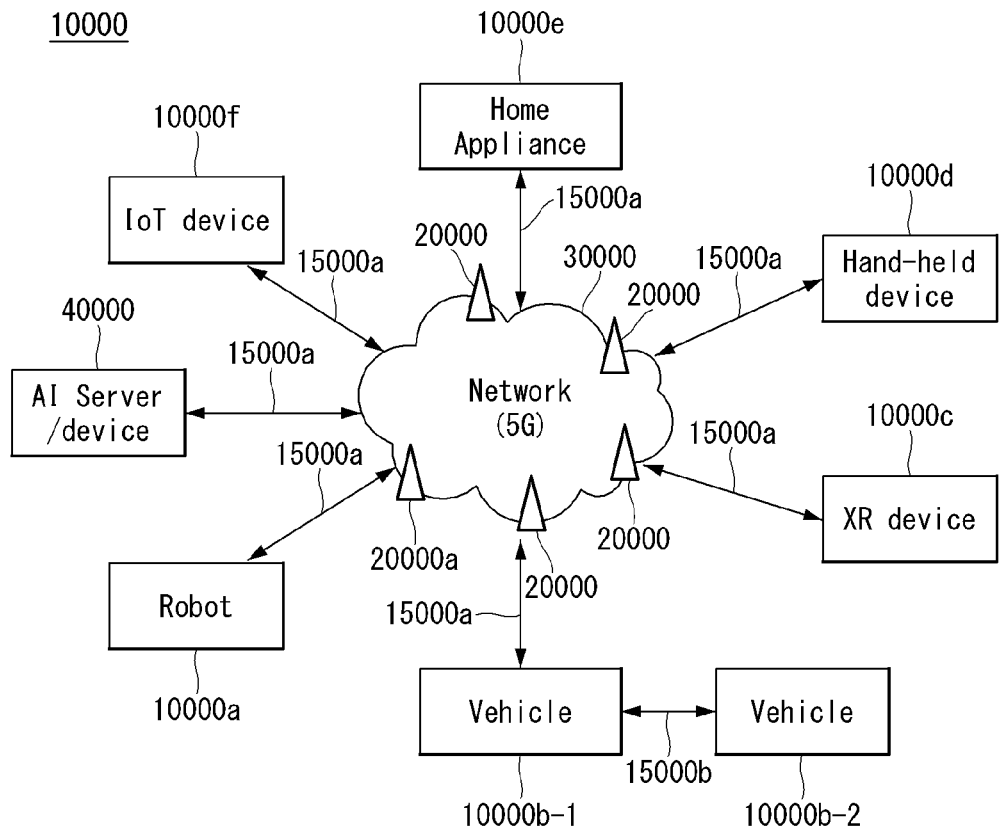
[FIG. 24]
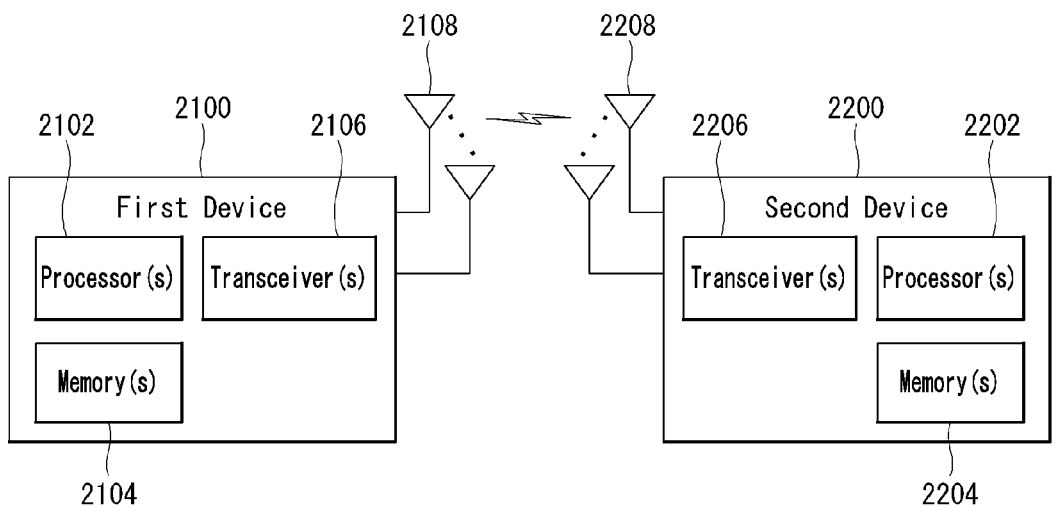

[FIG. 25]
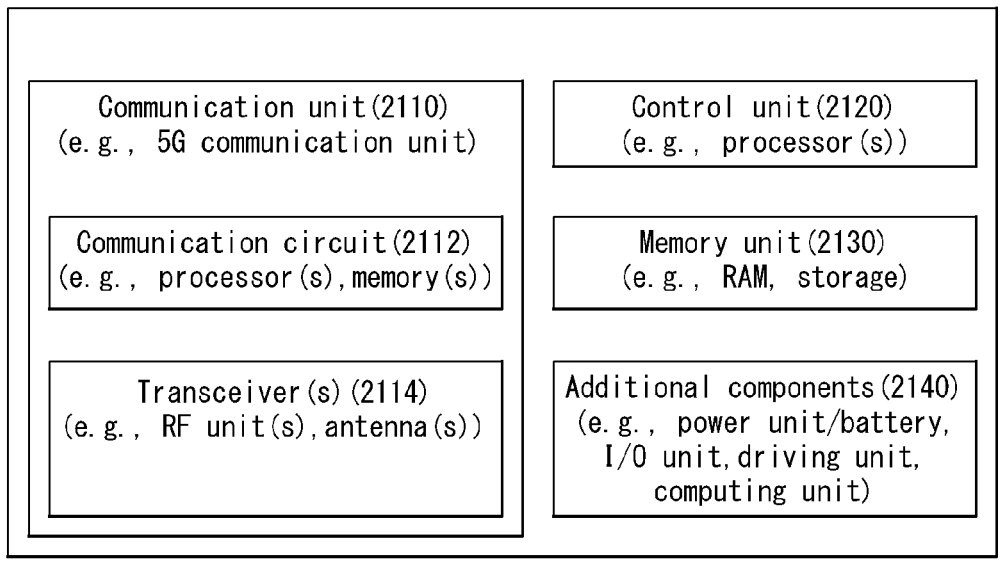
[FIG. 26]
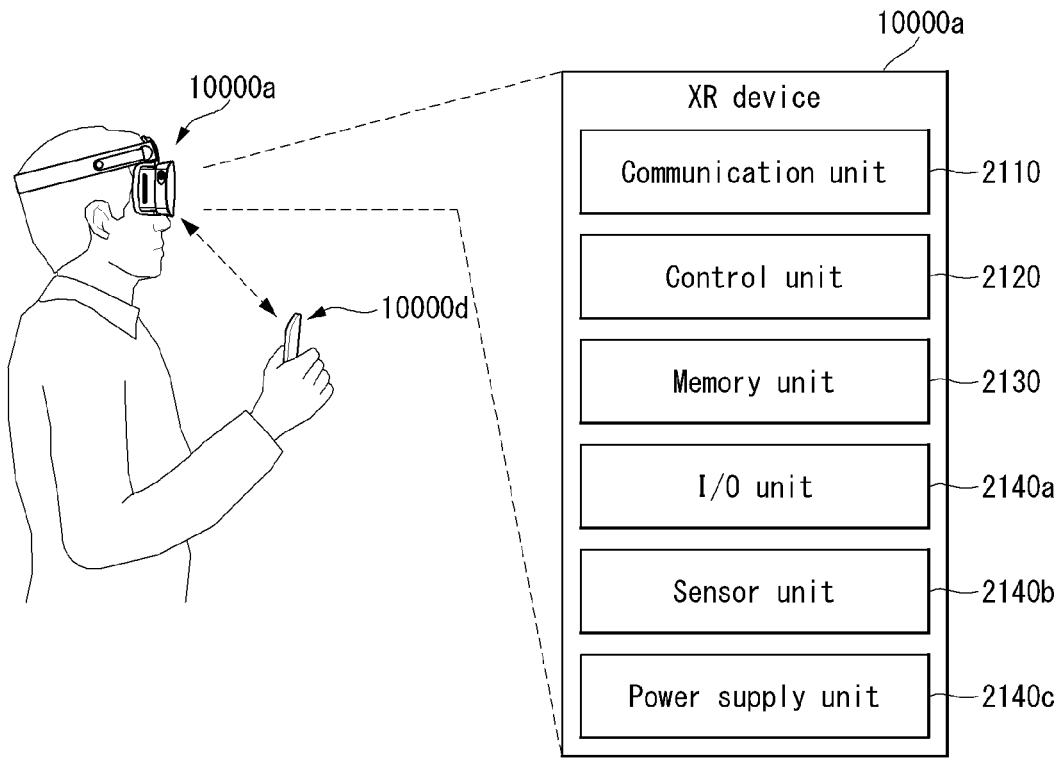

METHOD FOR REPORTING CHANNEL STATE INFORMATION ACCORDING TO DRX MODE OPERATION IN WIRELESS COMMUNICATION SYSTEM, AND DEVICE FOR SAME

This application is the National Stage filing under 35 U.S.C. 371 of International Application No. PCT/KR2019/012369, filed on Sep. 23, 2019, which claims the benefit of KR Application No. 10-2018-0114466 filed on Sep. 21, 2018, and KR Application No. 10-2019-0091294, filed on Jul. 26, 2019, the contents of which are all hereby incorporated by reference herein in their entirety.

TECHNICAL FIELD

The present disclosure relates to a wireless communication system, and more particularly, to a method of reporting channel state information according to a DRX mode operation, and a device for supporting the same.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Purpose

An embodiment of the present disclosure provides a method of reporting channel state information.

Furthermore, an embodiment of the present disclosure also provides a method of providing a configuration for reporting channel state information in a CoMP system.

Furthermore, an embodiment of the present disclosure also provides a method for determining a subband for calculating a parameter related to channel state information in a CoMP system.

The technical purposes to be achieved in the present disclosure are not limited to the technical purposes as mentioned above. Other technical purposes as not mentioned will be clearly understood by those of ordinary skill in the technical field to which the present disclosure belongs from the following description.

Technical Solution

Provided is a method of reporting Channel State Information (CSI) in a wireless communication system.

Specifically, the method of performed by a terminal includes: receiving discontinuous reception (DRX) configuration information from a first base station and a second base station; receiving first configuration information related to a channel state information (CSI) report of a first bandwidth part (BWP) from the first base station and second configuration information related to a CSI report of a second BWP from the second base station, in which the first BWP is composed of a plurality of first subbands including at least one first subband for the CSI report, the second BWP is composed of a plurality of second subbands including at least one second subband for the CSI report, and the first configuration information and the second configuration information are received only during a specific time based on the DRX configuration information; and based on that the at least one first subband and the at least one second subband partially or entirely overlap, obtaining a first CSI for overlapping at least one subband; and reporting the first CSI to the first base station and the second base station.

Furthermore, in the present disclosure, when the at least one first subband and the at least one second subband entirely overlap, the at least one subband is the at least one first subband or the at least one second subband, a size of the first BWP and the a size of second BWP are same, and each of a size of the at least one first subband and a size of the at least one second subband is same.

Furthermore, in the present disclosure, when a size of the at least one first subband and a size of the at least one second subband are set differently for each other, the UE recognizes that the first configuration information and the second configuration information are not valid.

Furthermore, in the present disclosure, the first configuration information includes a first size value for a plurality of first subbands, and the second configuration information includes a second size value for a plurality of second subbands.

Furthermore, in the present disclosure, when the at least one first subband and the at least one second subband partially overlap, the at least one subband is calculated based on a smaller or larger value of the first size value and the second size value.

Furthermore, in the present disclosure, when the at least one first subband and the at least one second subband partially overlap and the first size value is less than the second size value, the at least one subband is determined based on the at least one first subband or the at least one second subband.

Furthermore, in the present disclosure, the method further includes: obtaining a second CSI for remaining subbands except for the at least one subband among the at least one first subband; and transmitting the second CSI to the first base station.

Furthermore, in the present disclosure, the method further includes: obtaining a second CSI for remaining subbands except for the at least one subband among the at least one second subband; and transmitting the second CSI to the second base station.

Furthermore, in the present disclosure, the at least one first subband and the at least one second subband are indicated through a bitmap.

Furthermore, in the present disclosure, the first configuration information and the second configuration information are transmitted to the terminal based on a CoMP mode, the CoMP mode is indicated to the terminal through an explicit or implicit method, and in the implicit method, the terminal recognizes the CoMP mode based on that a specific condition is satisfied.

Furthermore, in the present disclosure, the specific condition is a case that two or more DMRS (Demodulation Reference Signal) groups are set to the terminal from the first base station and the second base station, a case that a QCL (Quasi Co-Located) reference signal indicated by a Transmission Configuration Indicator (TCI) received from the first base station and the second base station is 2 or more, a case that some or all of active BWPs respectively set from the first base station and the second base station overlap, a case that some or all of reference signals (RS) for CSI measurement set in each of the active BWPs overlap in the frequency domain, or a case that some or all of the resource regions of a physical downlink shared channel (PDSCH) each received from the first base station and the second base station overlap.

Furthermore, in the present disclosure, a terminal reporting channel state information (CSI) in a coordinated multipoint (CoMP) system includes: RF (Radio Frequency) module for transmitting and receiving a radio signal; and a processor functionally connected to the RF module, in which the processor configured to: receive discontinuous reception (DRX) configuration information from a first base station and a second base station; receive first configuration information related to a channel state information (CSI) report of a first bandwidth part(BWP) from the first base station and second configuration information related to a CSI report of a second BWP from the second base station, in which the first BWP is composed of a plurality of first subbands including at least one first subband for the CSI report, the second BWP is composed of a plurality of second subbands including at least one second subband for the CSI report, the first configuration information and the second configuration information are received only during a specific time based on the DRX configuration information; and based on that the at least one first subband and the at least one second subband partially or entirely overlap, obtain a first CSI for overlapping at least one subband; and report the first CSI to the first base station and the second base station.

Furthermore, in the present disclosure, when the at least one first subband and the at least one second subband entirely overlap, the at least one subband is the at least one first subband or the at least one second subband, a size of the first BWP and the a size of second BWP are same, and each of a size of the at least one first subband and a size of the at least one second subband is same.

Furthermore, in the present disclosure, when a size of the at least one first subband and a size of the at least one second subband are set differently for each other, the UE recognizes that the first configuration information and the second configuration information are not valid.

Furthermore, in the present disclosure, the first configuration information includes a first size value for a plurality of first subbands, and the second configuration information includes a second size value for a plurality of second subbands.

Furthermore, in the present disclosure, when the at least one first subband and the at least one second subband partially overlap, the at least one subband is calculated based on a smaller or larger value of the first size value and the second size value.

Furthermore, in the present disclosure, when the at least one first subband and the at least one second subband partially overlap and the first size value is less than the second size value, the at least one subband is determined based on the at least one first subband or the at least one second subband.

Furthermore, in the present disclosure, the method further includes: obtaining a second CSI for remaining subbands except for the at least one subband among the at least one first subband; and transmitting the second CSI to the first base station.

Furthermore, in the present disclosure, the method further includes: obtaining a second CSI for remaining subbands except for the at least one subband among the at least one second subband; and transmitting the second CSI to the second base station.

Furthermore, in the present disclosure, the at least one first subband and the at least one second subband are indicated through a bitmap.

Advantageous Effect

According to the present disclosure, there is an effect that in the CoMP system, a plurality of channel state information for a plurality of base stations can be efficiently measured and reported.

Furthermore, there is an effect that in the CoMP system, information on a subband for calculating a parameter related to the channel state information for the plurality of base stations is provided to a UE to efficiently calculate the parameter for the channel state information.

The effects that may be obtained from the present disclosure are not limited to the effects mentioned above. Other effects not mentioned may be clearly understood by those of ordinary skill in the technical field to which the present disclosure belongs from the following description.

BRIEF DESCRIPTION OF THE DRAWINGS

The accompanying drawings, which are included as part of the detailed description to help understand the present disclosure, provide embodiments of the present disclosure, and describe technical features of the present disclosure together with the detailed description FIG. 1 is a perspective view of an augmented reality electronic device according to an embodiment of the present disclosure.

FIG. 2 illustrates an AI device according to an embodiment of the present disclosure.

FIG. 3 illustrates an AI server according to an embodiment of the present disclosure.

FIG. 4 illustrates an AI system according to an embodiment of the present disclosure.

FIG. 5 is a diagram illustrating an example of an overall system structure of NR to which a method proposed in the present disclosure is applicable.

FIG. 6 illustrates a relationship between an uplink frame and a downlink frame in a wireless communication system to which a method proposed in the present disclosure is applicable.

FIG. 7 illustrates an example of a resource grid supported in a wireless communication system to which a method proposed in the present disclosure is applicable.

FIG. 8 illustrates examples of a resource grid for each antenna port and numerology to which a method proposed by the present disclosure is applicable.

FIG. 9 is a diagram illustrating an example of a self-contained slot structure to which a method proposed in the present disclosure is applicable.

FIG. 10 illustrates a transceiver unit model in the wireless communication system to which the method proposed in the present disclosure is applicable.

FIG. 11 is a diagram illustrating a hybrid beamforming structure in terms of TXRU and a physical antenna in the wireless communication system to which the method proposed in the present disclosure is applicable.

FIG. 12 is a diagram illustrating an example of a beam sweeping operation to which the method proposed in the present disclosure is applicable.

FIG. 13 is a diagram illustrating an example of an antenna array to which the method proposed in the present disclosure is applicable.

FIG. 14 is a diagram illustrating an example of configuring a reporting subband set for CoMP to which the method proposed in the present disclosure is applicable.

FIG. 15 is a diagram illustrating another example of configuring a reporting subband set for CoMP to which the method proposed in the present disclosure is applicable.

FIG. 16 is a flowchart showing an example of periodic CSI reporting to which the method proposed in the present disclosure is applicable.

FIG. 17 is a flowchart showing an example of a method of performing an Idle mode DRX operation.

FIG. 18 is a diagram illustrating an example of an Idle mode DRX operation.

FIG. 18 is a diagram illustrating an example of an Idle mode DRX operation.

FIG. 19 is a flowchart showing an example of a method of performing a C-DRX operation.

FIG. 20 is a diagram illustrating an example of a C-DRX operation.

FIG. 21 is a diagram illustrating an example of power consumption depending on a state of a UE.

FIG. 22 is a flowchart showing an example of an operation method of a UE that performs a CSI reporting configuration method proposed in the present disclosure.

FIG. 23 illustrates a communication system applicable to the present disclosure.

FIG. 24 illustrates a wireless device applicable to the present disclosure.

FIG. 25 illustrates another example of the wireless device applied to the present disclosure.

FIG. 26 illustrates an XR device applicable to the present disclosure.

MODE FOR DISCLOSURE

Hereinafter, preferred embodiments according to the present disclosure will be described in detail with reference to the accompanying drawings. The detailed description to be disclosed below with the accompanying drawings is intended to describe exemplary embodiments of the present disclosure, and is not intended to represent only embodiments in which the present disclosure may be practiced. The detailed description below includes specific details to provide a thorough understanding of the present disclosure. However, those skilled in the art appreciate that the present disclosure may be practiced without these specific details.

In some cases, in order to avoid obscuring the concept of the present disclosure, well-known structures and devices may be omitted, or may be illustrated in a block diagram form centering on core capabilities of each structure and device.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA(Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

5G new radio (5G NR) defines enhanced mobile broadband (eMBB), massive machine type communications (mMTC), Ultra-Reliable and Low Latency Communications (URLLC), vehicle-to-everything (V2X) according to a usage scenario.

In addition, the 5G NR standard is classified into standalone (SA) and non-standalone (NSA) according to co-existence between the NR system and the LTE system.

In addition, the 5G NR supports various subcarrier spacings, and supports CP-OFDM in downlink and CP-OFDM and DFT-s-OFDM (SC-OFDM) in uplink.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

In addition, in the present disclosure, "A and/or B" may be interpreted as the same meaning as "including at least one of A or B".

5G Scenario

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas.

Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

<Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving (Autonomous-Driving)>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a perspective view of an augmented reality electronic device according to an embodiment of the present disclosure.

As illustrated in FIG. 1, the electronic device according to an embodiment of the present disclosure may include a frame 1000, a control unit 2000, and a display unit 3000.

The electronic device may be provided as a glass type (smart glass). The glass-type electronic device may be configured to be worn on the head of the human body and may include a frame (case, housing, etc.) 1000 therefor. The frame 1000 may be made of a flexible material to facilitate wearing.

The frame 1000 is supported on the head and has a space on which various components are mounted. As illustrated, electronic components such as the control unit 2000, a user input unit 1300, or an audio output unit 1400 may be mounted on the frame 1000. Furthermore, a lens covering at least one of a left eye and a right eye may be detachably mounted on the frame 1000.

As illustrated in FIG. 1, the frame 1000 may have a glass form worn on a face in the human body of a user, but the present disclosure is not limited thereto and the frame 100 may have a form such as goggles, etc., which are worn in close contact with the face of the user, etc.

Such a frame 1000 may include a front frame 1100 having at least one opening and a pair of side frames 1200 which extend in a first direction y intersecting the front frame 1100 and are parallel to each other.

The control unit 2000 is provided to control various electronic components provided in the electronic device.

The control unit 2000 may generate an image to be shown to the user or a video in which the images are continued. The control unit 2000 may include an image source panel generating the image and a plurality of lenses which diffuses and converges light generated from the image source panel.

The control unit 2000 may be fixed to any one side frame 1200 of both side frames 1200. For example, the control unit 2000 may be fixed to an inside or an outside of any one side frame 1200 or embedded and integrally formed in any one side frame 1200. Alternatively, the control unit 2000 may be fixed to the front frame 1100 or provided separately from the electronic device.

The display unit 3000 may be implemented in the form of Head Mounted Display (HMD). The HMD form refers to a display scheme that is mounted on the head and displays the video directly in front of the user's eye. When the user wears the electronic device, the display unit 3000 may be disposed to correspond to at least one of the left eye and the right eye so as to provide the video directly in front of the user's eye. In this figure, it is illustrated that the display unit 3000 is located at a portion corresponding to the right eye so as to output the video toward the right eye of the user.

The display unit 3000 may allow the image generated by the control unit 2000 to be displayed to the user while the user visually recognizes an external environment. For example, the display unit 3000 may project the image to a display area using a prism.

In addition, the display unit 3000 may be formed to be light-transmitting so that the projected image and a general field of view (a range which the user seeds through the eyes) may be seen at the same time. For example, the display unit 3000 may be translucent and may be formed by an optical element including glass.

In addition, the display unit 3000 may be inserted into or fixed to the opening included in the front frame 1100 or located on a rear surface (i.e., between the opening and the user) of the opening to be fixed to the front frame 1100. In the figure, a case where the display unit 3000 is located on the rear surface of the opening and fixed to the front frame 1100 is illustrated as an example, but unlike this, the display unit 3000 may be arranged and fixed at various locations of the frame 1000.

As illustrated in FIG. 1, in the electronic device, when image light for the image is incident on one side of the display unit 3000 by the control unit 2000, the image light is emitted to the other side through the display unit 3000 to show the image generated by the control unit 2000 to the user.

As a result, the user may view the image generated by the control unit 2000 simultaneously while viewing the external environment through the opening of the frame 1000. That is, the video output through the display unit 3000 may be viewed as overlapping with the general field of view. The electronic device may provide augmented reality (AR) that superimposes a virtual image on a real image or a background by using such display characteristics.

FIG. 2 illustrates an AI device 100 according to an embodiment of the disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 2, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 3 illustrates an AI server 200 according to an embodiment of the disclosure.

Referring to FIG. 3, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 4 illustrates an AI system 1 according to an embodiment of the disclosure.

Referring to FIG. 4, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100*d* or the home appliances 100*e*, that is, AI devices configuring the AI system 1, over the cloud network 10, and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model, and may generate a response or control command based on the deduced result value.

Hereinafter, various embodiments of the AI devices 100*a* to 100*e* to which the above-described technology is applied are described. In this case, the AI devices 100*a* to 100*e* shown in FIG. 4 may be considered to be detailed embodiments of the AI device 100 shown in FIG. 1.

<AI+Robot>

An AI technology is applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* may include a robot control module for controlling an operation. The robot control module may mean a software module or a chip in which a software module has been implemented using hardware.

The robot 100*a* may obtain state information of the robot 100*a*, may detect (recognize) a surrounding environment and object, may generate map data, may determine a moving path and a running plan, may determine a response to a user interaction, or may determine an operation using sensor information obtained from various types of sensors.

In this case, the robot 100*a* may use sensor information obtained by at least one sensor among LIDAR, a radar, and a camera in order to determine the moving path and running plan.

The robot 100*a* may perform the above operations using a learning model configured with at least one artificial neural network. For example, the robot 100*a* may recognize a surrounding environment and object using a learning model, and may determine an operation using recognized surrounding environment information or object information. In this case, the learning model may have been directly trained in the robot 100*a* or may have been trained in an external device, such as the AI server 200.

In this case, the robot 100*a* may directly generate results using the learning model and perform an operation, but may perform an operation by transmitting sensor information to an external device, such as the AI server 200, and receiving results generated in response thereto.

The robot 100*a* may determine a moving path and running plan using at least one of map data, object information detected from sensor information, or object information obtained from an external device. The robot 100*a* may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

<AI+Self-Driving>

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user's behavior or voice speaking, may determine a response based on the obtained intention information, and may perform an operation.

<AI+XR>

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

<AI+Robot+Self-Driving>

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

<AI+Robot+XR>

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Definition of Terms eLTE eNB: An eLTE eNB is an evolution of an eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: It corresponds to one subcarrier spacing in the frequency domain. By scaling the reference subcarrier spacing to an integer N, different numerology can be defined.

NR: NR Radio Access or New Radio

System General

FIG. 5 illustrates an example of an overall structure of a new radio (NR) system to which a method proposed by the present disclosure is applicable.

Referring to FIG. 5, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$, where $\Delta f_{max}=480 \cdot 10^3$, and $N_f=4096$. Downlink and uplink transmissions are organized into radio frames with a duration of $T_f=(\Delta f_{max} N_f/100) \cdot T_s=10$ ms. The radio frame consists of ten subframes each having a section of $T_{sf}=(\Delta f_{max} N_f/1000) \cdot T_s=1$ ms. In this case, there may be a set of frames in the uplink and a set of frames in the downlink.

FIG. 6 illustrates a relation between a UL frame and a DL frame in a wireless communication system to which a method proposed by the disclosure is applicable.

As illustrated in FIG. 6, a UL frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe, and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology in use and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 represents the number of OFDM symbols $N_{symb}^{slot}$ per slot in a normal CP, the number of slot $N_{slot}^{frame,\mu}$ per radio frame and the number of slot $N_{slot}^{subframe,\mu}$ per subframe, and Table 3 represents the number of OFDM symbols in an extended CP, the number of slot per radio frame and the number of slot per subframe.

Referring to FIG. 7, a resource grid is composed of $N_{RB}^\mu N_{sc}^{RB}$ subcarriers in a frequency domain, each subframe composed of 14·2µ OFDM symbols, but the disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols. Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

In this case, shown as FIG. 8, one resource grid may be configured for the numerology µ and an antenna port p.

TABLE 2

| | Slot configuration | | | | | |
|---|---|---|---|---|---|---|
| | 0 | | | 1 | | |
| µ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| µ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 7 illustrates an example of a resource grid supported in a wireless communication system to which a method proposed by the disclosure may be applied.

FIG. 8 shows examples of an antenna port and a resource grid for each neurology to which the method proposed in the present disclosure may be applied.

Each element of the resource grid for the numerology µ and the antenna port p is indicated as a resource element, and may be uniquely identified by an index pair (k,l). Herein, $k=0, \ldots, N_{RB}^\mu N_{sc}^{RB}-1$ is an index in the frequency domain, and $\bar{l}=0, \ldots, 2^\mu N_{symb}^{(\mu)}-1$ indicates a location of a symbol in a subframe. To indicate a resource element in a slot, the index pair (k,l) is used. Herein, $l=0, \ldots, N_{symb}^\mu-1$.

The resource element (k,$\bar{l}$) for the numerology µ and the antenna port p corresponds to a complex value $a_{k,\bar{l}}^{(p,\mu)}$. When there is no risk of confusion or when a specific antenna port or numerology is specified, the indexes p and µ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^\mu-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Slot Structure

In order to minimize the latency of data transmission in the TDD system, the 5th generation New RAT (NR) considers the self-contained slot structure as shown in FIG. 8.

That is, FIG. 9 is a diagram showing an example of a self-contained slot structure to which the method proposed according to the present disclosure may be applied.

In FIG. 9, a shaded region 910 represents a downlink control region, and a black region 920 represents an uplink control region.

A blank region 930 may be used for downlink data transmission, or may be used for uplink data transmission.

The feature of this structure is that DL transmission and UL transmission are sequentially performed within one slot, and DL data is transmitted and UL Ack/Nack is transmitted and received within one slot.

Such a slot may be defined as a 'self-contained slot'.

That is, using this slot structure, the base station may reduce a time consumed to retransmit data to the user equipment when a data transmission error occurs, and thus may minimize the latency of the final data transfer.

This self-contained slot structure requires a time gap for which the base station and the user equipment switch from a transmission mode to a reception mode or switch from a reception mode to a transmission mode.

To this end, in the corresponding slot structure, some OFDM symbols at the time of switching from DL to UL are set as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements. In this case, although varying depending upon a method of connecting B number of TXRU and Q number of antenna elements, beam directions capable of being transmitted at the same time is restricted to be less than B.

Hereinafter, typical examples of a method of connecting TXRU and antenna elements will be described with reference to drawings.

FIG. 10 is an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 10(*a*), or as a TXRU virtualization model option-2: full-connection model.

Referring to FIG. 10(*a*), in the sub-array partition model, the antenna elements are divided into multiple antenna element groups, and each TXRU may be connected to one of the multiple antenna element groups. In this case, the antenna elements are connected to only one TXRU.

Referring to FIG. 10(*b*), in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIG. 10, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping In FIG. 10 is merely an example, and the present disclosure is not limited thereto and may be equivalently applied even to mapping of TXRUs and antenna elements which can be implemented in a variety of hardware forms.

In the next system (e.g., 5G), depending on the application field and/or the type of traffic, the UE does not receive the UL grant before performing the uplink transmission and performs uplink transmission in a semi-persistent resource and it is possible to perform a configured grant transmission. In addition, in the existing system, that is, LTE, a similar operation is possible in DL and UL through semi-persistent scheduling (SPS). In the configured grant transmission, a radio resource which different UEs share based on a contention or a radio resource dedicatedly allocated to the UE may be used. For the configured grant transmission, since a UL grant receiving operation is not required prior to the transmission, the radio resources may be utilized in a service or traffic of a field requiring a lower latency time. It is considered that the radio resource used for the configured grant transmission uses a different modulation and coding scheme or a different transmission block size or a different transmission time interval (TT) from a radio resource allocated through the UL grant. The UE may be allocated with one or multiple radio resources for the configured grant transmission. Multiple radio resources used for the configured grant transmission may be have the same or different size or modulation encoding scheme, time and/or frequency scheduling units and overlapping may be allowed. A method in which the UE attempts to transmit the same data several times in order to increase a success rate of the configured grant transmission is also considered. In the next system, a separated RRC configuration may be performed for configured grant transmission.

Further, in a New RAT system, when multiple antennas are used, a hybrid beam forming technique combining digital beam forming and analog beam forming is emerging. In this case, the analog beamforming (or radio frequency (RF) beamforming) means an operation of performing precoding (or combining) in an RF stage. In the hybrid beamforming, each of a baseband stage and the RF stage perform precoding (or combining), thereby reducing the number of RF chains and the number of digital (D)/analog (A) converters and achieving performance close to the digital beamforming. For convenience, the hybrid beamforming structure may be represented by N transceiver units (TXRU) and M physical antennas. Then, the digital beamforming for L data layers to be transmitted by the transmitter may be represented by an N by L matrix, and then the N digital signals converted are converted into an analog signal via the TXRU and then applied the analog beamforming represented by an M by N matrix.

FIG. 11 is a diagram illustrating a hybrid beamforming structure in terms of TXRU and a physical antenna in the wireless communication system to which the method proposed in the present disclosure may be applied.

In FIG. 11, a case where the number of digital beams is L and the number of analog beams is N is illustrated.

In the New RAT system, considered is a direction in which it is designed so that the BS may change the analog beamforming by the unit of the symbol to support more efficient beamforming to a UE positioned in a specific region. Furthermore, in FIG. 11, when N specific TXRUs and M specific RF antennas are defined as one antenna panel, a scheme that introduces a plurality of antenna panels capable of independent hybrid beamforming is also considered in the New RAT system.

Feedback of Channel State Information (CSI)

In a 3GPP LTE/LTE-A system, user equipment (UE) is defined to report channel state information (CSI) to a base station (BS or eNB).

The CSI collectively refers to information that can indicate the quality of a radio channel (or referred to as a link) formed between the UE and the antenna port. For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI. The PMI is a value reflecting a channel space characteristic and represents a preferred precoding index preferred by the UE based on a metric such as signal-to-interference-plus-noise ratio (SINR). The CQI is a value representing the strength of the channel, and generally refers to a reception SINR that can be obtained when the BS uses the PMI.

In the 3GPP LTE/LTE-A system, the BS configures a plurality of CSI processes to the UE and may receive CSI for each process. Here, the CSI process is constituted by a CSI-RS for signal quality measurement from the BS and a CSI-interference measurement (CSI-IM) resource for interference measurement.

Virtualization of Reference Signal (RS)

In the mmW, it is possible to transmit a PDSCH only in one analog beam direction at a time by analog beamforming. In this case, data transmission from the BS is possible only to a small number of UEs in the corresponding direction. Therefore, if necessary, the analog beam direction is differently configured for each antenna port so that data transmission can be simultaneously performed to a plurality of UEs in several analog beam directions.

FIG. 12 is a diagram illustrating an example of a beam sweeping operation to which the method proposed in the present disclosure may be applied.

As described in FIG. 11, when the BS uses a plurality of analog beams, a beam sweeping operation is considered, which allows all UEs to have a reception opportunity by changing a plurality of analog beams to which the BS intends to apply in a specific subframe according to the symbol at least with respect to a synchronization signal, system information, and a paging signal because an analog beam which is advantageous for signal reception for each UE.

FIG. 12 illustrates an example of a beam sweeping operation for a synchronization signal and system information in a downlink transmission process. In FIG. 12, a physical resource (or physical channel) through which the system information is transmitted in a broadcasting scheme in the New RAT is referred to as physical broadcast channel (xPBCH).

In this case, analog beams belonging to different antenna panels within one symbol may be simultaneously transmitted and discussed is a scheme that introduces a beam reference signal (BRS) which is a reference signal transmitted, to which a single analog beam (corresponding to a specific antenna panel) is applied as illustrated in FIG. 11 to measure channels depending on the analog beam.

The BRS may be defined for a plurality of antenna ports and each antenna port of the BRS may correspond to the single analog beam.

In this case, unlike the BRS, the synchronization signal or xPBCH may be transmitted, to which all of the analog beams in the analog beam group are applied so that the signal may be well received by random UEs.

RRM Measurement

The LTE system supports RRM operations including power control, scheduling, cell search, cell reselection, handover, radio link or connection monitoring, connection establishment/re-establishment, and the like.

In this case, the serving cell may request RRM measurement information, which is a measurement value for performing the RRM operations, to the UE.

For example, the UE may measure information including cell search information for each cell, reference signal received power (RSRP), reference signal received quality (RSRQ), and the like and report the measured information to the BS.

Specifically, in the LTE system, the UE receives 'measConfig' as a higher layer signal for RRM measurement from the serving cell. The UE measures the RSRP or RSRQ according to 'measConfig'.

The RSRP, the RSRQ, and the RSSI are defined as below.
  RSRP: The RSRP may be defined as a linear average of
    a power contribution [W] of a resource element carrying a cell specific reference signal within a considered measurement frequency bandwidth. A cell specific reference signal R0 may be used for deciding the RSRP. When the UE may reliably detect that R1 is available, the UE may decide the RSRP by using R1 in addition to R0.
  A reference point of the RSRP may be an antenna connector of the UE.

When receiver diversity is used by the UE, a reported value need not be smaller than the RSRP corresponding to a random individual diversity branch.

RSRQ: The reference signal received quality (RSRQ) is defined as a ratio N×RSRP/(E-UTRA carrier RSSI) and N represents the number of RBs of an E-UTRA carrier RSSI measurement bandwidth. Measurements of numerator and denominator should be performed through the same set of resource blocks.

The E-UTRA carrier received signal strength indicator (RSSI) is received through a block by the UE from all sources including N resource adjacent channel interference, thermal noise, etc., in a linear average of the total received power [W] measured only in an OFDM symbol containing a reference symbol for antenna port 0 and a measurement bandwidth.

When the higher layer signaling represents a specific subframe for performing the RSRQ measurement, the RSSI is measured for all OFDM symbols in the indicated subframe.

The reference point for THE RSRQ should be the antenna connector of the UE.

When the receiver diversity is used by the UE, the reported value should not be smaller than the corresponding RSRQ of the random individual diversity branch.

RSSI: The RSSI means received broadband power including thermal noise and noise generated at the receiver within a bandwidth defined by a receiver pulse shaping filter.

The reference point for measuring the RSSI should be the antenna connector of the UE. When the receiver diversity is used by the UE, the reported value should not be smaller than the corresponding UTRA carrier RSSI of the random individual receive antenna branch.

According to such a definition, the UE which operates in the LTE system may be allowed to measure the RSRP in a bandwidth corresponding to one of 6, 15, 25, 50, 75, and 100 resource blocks (RBs) through an information element (IE) related with an allowed measurement bandwidth transmitted system information block type 3 (SIB3) in the case of intra-frequency measurement and through an allowed measurement bandwidth transmitted in SIB5 in the case of inter-frequency measurement.

Alternatively, in the absence of such an IE, the measurement may be performed in a frequency band of the entire downlink (DL) system by default. In this case, when the UE receives the allowed measurement bandwidth, the UE may consider the corresponding value as a maximum measurement bandwidth and arbitrarily measure the value of the RSRP within the corresponding value.

However, when the serving cell transmits an IE defined as WB-RSRQ and the allowed measurement bandwidth is set to 50 RB or more, the UE needs to calculate the RSRP value for the entire allowed measurement bandwidth. Meanwhile, the RSSI may be measured in the frequency band of the receiver of the UE according to the definition of the RSSI bandwidth.

FIG. 13 is a diagram illustrating an example of an antenna array to which the method proposed in the present disclosure may be applied.

Referring to FIG. 13, the normalized panel antenna array may be constituted by Mg panels and Ng panels in a horizontal domain and a vertical domain, respectively.

In this case, one panel is constituted by M columns and N rows, respectively, and an X-pol antenna is assumed in FIG. 13. Therefore, the total number of antenna elements may be 2*M*N*Mg*Ng.

Antenna Port Quasi Co-Location

The UE may be configured by a list of up to M TCI-states in higher layer parameter PDSCH-Config in order to decode the PDSCH according to the detected PDCCH with DCI intended for the UE and the serving cell, and here, M is determined by a UE capability.

Each TCI-State includes parameters for configuring a quasi co-location relationship between one or two DL reference signals and a DM-RS port of the PDSCH.

The quasi co-location relationship is constituted by qcl-Type1 for a first downlink reference signal and qcl-Type2 for a second downlink reference signal (only when configured).

In the case of two downlink reference signals, QCL types should not be the same as each other regardless of whether two downlink reference signals are identical or different.

The quasi co-location types corresponding to the downlink reference signals, respectively may be given by qcl-Type in the higher layer parameter QCL-Info, and may have one of the following values (types).

'QCL-TypeA': {Doppler shift, Doppler spread, average delay, average spread}

'QCL-TypeB': {Doppler shift, Doppler spread}

'QCL-TypeC': {Doppler shift, average delay}

'QCL-TypeD': {Spatial Rx parameter}

The UE receives an activation command used for mapping a maximum of eight TCI states to codepoints of DCI field 'Transmission Configuration Indication'.

When HARQ-ACK corresponding to the PDSCH carrying the activation command is transmitted on slot n, mapping between codepoints of the DCI field 'Transmission Configuration Indication' and the TCI states should be started from $n+3N_{slot}^{subframe,\mu}+1$.

Before the UE receives the higher layer configuration of the TCI states and receives the activation command, the UE may assume that the DM-RS ports of the PDSCH of the serving cell has a quasi co-location relationship with the SS/PBCH block determined in an initial access procedure for 'QCL-TypeA' and if applicable, the same is applied even to 'QCL-TypeD'.

When the UE is configured to the higher layer parameter 'tci-PresentInDCI' configured to 'enable' for CORESET for scheduling the PDSCH, the UE assumes that the RCI field is present in DCI format 1_1 of the PDCCH transmitted from the CORESET.

When 'tci-PresentInDCI' for CORESET for scheduling the PDSCH is not configured or the PDSCH is scheduled to DCI format 1_0 for determining the PDSCH antenna port quasi co-location, the UE assumes that the TCI state for the PDSCH is the same as the TCI state applied to CORESET used for PDCCH transmission.

In the case where 'tci-PresentInDCI' is configured to 'enable', when the PDSCH is scheduled according to DCI format 1_1, the UE should use TCI-State according to the DCI and the value of the 'Transmission Configuration Indication' field of the detected PDCCH in order to determine the PDSCH antenna port quasi co-location.

When a time offset between reception of the downlink DCI and the corresponding PDSCH is equal to or more than threshold 'Threshold-Sched-Offset' based on the UE capability reported, the UE assumes that the DM-RS ports of the PDSCH of the serving cell is quasi co-located with a reference signal of the TCI state for the QCL type parameter given by the indicated TCI state.

When an offset between reception of the downlink DCI and the corresponding PDSCH is less than the threshold 'Threshold-Sched-Offset' in two situations in which 'tci-PresentInDCI' is configured to 'enable' and 'tciPresentIN- DCI' is not configured, the UE may assume that the antenna ports of one DM-RS port group of the PDSCH of the serving cell is quasi co-located with the reference signals of the TCI state for the QCL parameter(s) used for PDCCH quasi co-location.

In this case, the QCL parameter(s) is a parameter(s) used for PDCCH quasi co-location of a lowest CORESET-ID in a latest slot in which one or more CORESET(s) in the active BWP of the serving cell are configured for the UE.

When none of the configured TCI states includes 'QCL-TypeD', the UE should acquire other QCL assumptions from the TCI state indicated for the scheduled PDSCH regardless of the time offset between the reception of the downlink DCI and the corresponding PDSCH.

In the case of the higher layer parameter trs-Info and the periodic CSI-RS resource of configured NZP-CSI-RS-ResourceSet, the UE may expect that the TCI-state will indicate the following quasi co-location type(s).

- 'QCL-TypeC' with SS/PBCH block and 'QCL-TypeD' with the same SS/PBCH block if applicable
- 'QCL-TypeC' with SS/PBCH block, and CSI-RS resource of NZP-CSI-RS-ResourceSet configured by higher parameter 'repetition' and 'QCL-TypeD' if applicable In the case of the aperiodic CSI-RS resource of NZP-CSI-RS-ResourceSet configured to the higher layer parameter trs-Info, the UE expects that the TCI-State indicates the periodic CSI-RS of NZP-CSI-RS-ResourceSet configured to the higher layer parameter trs-Info and 'QCL-TypeD' and expects that the TCI-State indicates the same periodic CSI-RS resource and 'QCL-TypeD' if applicable.

For the higher layer parameter trs-Info and the CSI-RS resource of NZP-CSI-RS-ResourceSet configured without repetition, the UE may expect that the TCI-state indicates the following quasi co-location type(s).

- 'QCL-TypeA' having the higher layer parameter trs-Info and the CSI-RS resource of the configured NZP-CSI-RS-ResourceSet and if available, 'QCL-TypeD' having the SS/PBCH block, or
- 'QCL-TypeA' having the higher layer parameter trs-Info and the CSI-RS resource of the configured NZP-CSI-RS-ResourceSet and if available, 'QCL-TypeD' having the higher layer parameter repetition and the CSI-RS resource of the configured NZP-CSI-RS-ResourceSet, or
- if 'QCL-TypeD' is not available, 'QCL-TypeB' having the higher layer parameter trs-Info and the CSI-RS resource of the configured NZP-CSI-RS-ResourceSet For the higher layer parameter repetition and the CSI-RS resource of the configured NZP-CSI-RS-ResourceSet, the UE expects that the TCI-state indicates the following quasi co-location type(s).

- 'QCL-TypeA' having the higher layer parameter trs-Info and the CSI-RS resource of the configured NZP-CSI-RS-ResourceSet and if available, 'QCL-TypeD' having the same CSI-RS resource, or
- 'QCL-TypeA' having the higher layer parameter trs-Info and the CSI-RS resource of the configured NZP-CSI-RS-ResourceSet and if available, 'QCL-TypeD' having the higher layer parameter repetition and the CSI-RS resource of the configured NZP-CSI-RS-ResourceSet, or
- 'QCL-TypeC' with the SS/PBCH block and 'QCL-TypeD' with the same SS/PBCH block if available.

For the DM-RS of the PDCCH, the UE expects that the TCI-State indicates the following quasi-co-location type(s).

- 'QCL-TypeA' having the upper layer parameter trs-Info and the CSI-RS resource of the configured NZP-CSI-RS-ResourceSet and if available, 'QCL-TypeD' having the same CSI-RS resource, or
- 'QCL-TypeA' having the higher layer parameter trs-Info and the CSI-RS resource of the configured NZP-CSI-RS-ResourceSet and if available, 'QCL-TypeD' having the higher layer parameter repetition and the CSI-RS resource of the configured NZP-CSI-RS-ResourceSet, or
- if 'QCL-TypeD' is not available, 'QCL-TypeA' having the higher layer parameter trs-Info and the CSI-RS resource of the configured NZP-CSI-RS-ResourceSet For the DM-RS of the PDSCH, the UE expects that the TCI-State indicates the following quasi-co-location type(s).

- 'QCL-TypeA' having the higher layer parameter trs-Info and the CSI-RS resource of the configured NZP-CSI-RS-ResourceSet and if available, 'QCL-TypeD' having the same CSI-RS resource, or
- 'QCL-TypeA' having the higher layer parameter trs-Info and the CSI-RS resource of the configured NZP-CSI-RS-ResourceSet and if available, 'QCL-TypeD' having the higher layer parameter repetition and the CSI-RS resource of the configured NZP-CSI-RS-ResourceSet, or
- 'QCL-TypeA' having the higher layer parameter trs-Info and the CSI-RS resource of the NZP-CSI-RS-ResourceSet configured without repetition and if available, 'QCL-TypeD' having the same CSI-RS resource.

Reporting Configurations

According to the standard document 3GPP TS 38.214, the UE may calculate the CSI parameters by assuming the following dependencies between the CSI parameters (when reported).

L1 may be calculated according to the reported CQI, PMI, RI, and CRI.

The CQI may be calculated according to the reported PMI, RI, and CRI.

The PMI may be calculated according to the reported RI and CRI.

The RI may be calculated according to the reported CRI.

The reporting configuration of the CSI may be aperiodic (using the PUSCH), periodic (using the PUCCH), or semi-persistent (using the PUCCH or DCI activated by the PUSCH (DCI activated PUSCH)). The CSI-RS resources may be periodic, semi-permanent, or aperiodic. Table 4 shows supported combinations of the CSI reporting configuration and the CSI-RS resource configuration, and CSI reporting triggering method for the CSI-RS resource configuration. The periodic CSI-RS may be configured by the higher layer. The semi-persistent CSI-RS may be activated and deactivated. The aperiodic CSI-RS may be configured to be triggered or activated.

Table 4 is a table for triggering/activation of CSI reporting for a possible CSI-RS configuration.

TABLE 4

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

When the UE is configured by the higher layer parameter NZP-CSI-RS-ResourceSet and the higher layer parameter repetition is configured to 'off', the UE determines the CRI from a set of supported CRI and reports the number of each CRI report as defined in the standard document 3GPP TS 38.212. When the higher layer parameter repetition is configured to 'on', the CRI is not reported. The CRI reporting is not supported when the higher layer parameter codebookType is configured to 'typeII' or 'typeII-PortSelection'.

In the case of the periodic or semi-persistent CSI report on the PUCCH, the period (measured in slots) is configured by the higher layer parameter reportslotConfig.

In the case of the semi-persistent or aperiodic CSI report on the PUSCH, permitted slot offsets are configured by the higher layer parameter reportSlotOffsetList. The offset is selected within the activated/triggered DCI.

For the CSI reporting, the UE may be configured through higher layer signaling having one of two possible subband sizes and in this case, the subband is defined as adjacent PRBs of $N_{PRB}^{SB}$ and depends on the total number of PRBs of a bandwidth part according to Table 5.

TABLE 5

| Bandwidth part (PRBs) | Subband size (PRBs) |
|---|---|
| <24 | N/A |
| 24-72 | 4, 8 |
| 73-144 | 8, 16 |
| 145-275 | 16, 32 | reportFreqConfiguration included in CSI-ReportConfig indicates frequency granularity of the CSI report. In a CSI reporting setting configuration, a CSI reporting band is defined as a subset of subbands of the bandwidth part. In this case, reportFreqConfiguration indicates the following.

In csi-ReportingBand, the CSI is a contiguous or non-contiguous subset of the subbands of the bandwidth part for reporting. The UE does not expect to be configured to a CSI reporting band including subbands without a reference signal for the channel and interference.

Wideband CQI or subband CQI reporting is configured by a higher layer parameter cqi-FormatIndicator. When the wideband CQI reporting is configured, the wideband CQI is reported by each codeword of the entire CSI reporting band. When the subband CQI reporting is configured, one CQI for each codeword is reported for each subband of the CSI reporting band.

Wideband PMI or subband PMI reporting is configured by a higher layer parameter pmi-FormatIndicator. When the wideband PMI reporting is configured, the wideband PMI is reported for the entire CSI reporting band. When the subband PMI reporting is configured, except for two antenna ports, a single wideband indication i1 is reported for the entire CSI reporting band and one subband indication i2 is reported for each subband of the CSI reporting band. When subband PMIs are configured to two antenna ports, the PMI is reported for each subband of the CSI reporting band.

CSI reporting setting has wideband frequency granularity in the following case.

When reportQuantity is configured to 'cri-RI-PMI-CQI' or 'cri-RI-LI-PMI', cqi-FormatIndicator indicates single CQI reporting and pmi-FormatIndicator indicates single PMI reporting, or reportQuantity is configured to reportQuantity is configured to 'cri-RI-CQI' or 'cri-RI-i1-CQI' and cqi-FormatIndicator indicates single CQI reporting, or reportQuantity is configured to 'cri-RSRP' or 'ssb-Index-RSRP'.

Otherwise, the CSI reporting setting has subband frequency granularity.

A first subband size is given by $N_{PRB}^{SB} - (N_{BWP,i}^{start} \mod N_{PRB}^{SB})$, and a last subband size is given by $(N_{BWP,i}^{start} + N_{BWP,i}^{size}) \mod N_{PRB}^{SB}$ when $(N_{BWP,i}^{start} + N_{BWP,i}^{size}) \mod N_{PRB}^{SB} \neq 0$ and is $N_{PRB}^{SB}$ when $(N_{BWP,i}^{start} + N_{BWP,i}^{size}) \mod N_{PRB}^{SB} = 0$.

RI (when reported), CRI (when reported), CQI, and PMI configured by the single wideband indication i1 for the entire CSI reporting band. The UE assumes that one precoder is arbitrarily selected from a set of $N_p$ precoders for each PRG on the PDSCH and when a PRG size for CQI calculation is configured by a higher layer parameter pdsch-BundleSizeForCSI, the CQI is calculated according to reported i1 by assuming PDSCH transmission having precoders of $N_p \geq 1$.

In the case where the UE is configured to the semi-persistent CSI reporting, when the CSI-IM and NZP CSI-RS resources are periodically or semi-persistently configured, the UE reports the CSI. In the case where the UE is configured to the aperiodic CSI reporting, when the CSI-IM and NZP CSI-RS resources are periodically, semi-persistently, or aperiodically configured, the UE reports the CSI.

As more and more communication devices require larger communication capacity, there is a need for improved mobile broadband communication compared to the existing radio access technology. Further, massive machine type communications (MTCs), which provide various services anytime and anywhere by connecting many devices and objects, are one of the major issues to be considered in the next generation communication. In addition, a communication system design considering a service and/or UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, hereinafter, the technology will be called new RAT (NR) for convenience.

The CoMP technique is a scheme in which multiple base stations exchange (e.g., using an X2 interface) or utilize channel information (e.g., rank indicator (RI), channel quality information (CQI), precoding matrix indicator (PMI), layer indicator (LI), etc.)) fed back from the UE with each other to cooperatively transmit the feedback channel information to the UE and effectively control interference.

In this case, multiple base stations may exchange channel information fed back from the UE with each other by using an X2 interface.

According to a scheme using the channel information fed back from the UE, types of CoMP may be classified into Joint transmission (JT), Coordinated scheduling (CS), Coordinated beamforming (CB), dynamic point selection (DPS), dynamic point blanking (DPB), etc.

The CoMP type will be described below.

i) CS/CB

The CS/CB system is a system in which data is received from one TRxP, and the remaining TRxPs perform scheduling or beamforming to minimize the interference.

For example, when beamforming for transmitting data from TRxP1 to a specific UE, other TRxPs that may interfere with the specific UE use a beam pattern of a predetermined shape to reduce the interference according to the beam pattern selected by TRxP1.

ii) JT

The JT system is a system that transmits the same data from two or more TRxPs to the UE.

Since the same data is transmitted from an adjacent cell or adjacent TRxP when applying the JT system, a signal received from the adjacent cell becomes not the interference but a data signal to acquire a diversity effect or a signal reinforcement effect.

iii) DPS/DBP

The DPS system is a system in which multiple cells share and transmit the same data like the JT system and the DBP system means a system that turns off a signal transmitted in a resource configured by TRxPs.

However, unlike JT, actual data transmission is performed only through one cell having a minimum path loss according to the channel state of the UE in each subframe, and the remaining cells that are not selected are muted.

As a result, since data is received from a cell having a better channel state, reception performance of the UE is increased, thereby enhancing throughput at a cell boundary.

In the present disclosure, proposed is a signaling method for configuring the CSI reporting in order to more effectively report the CSI in a wireless communication environment such as Coordinated Multi Point (CoMP) which a plurality of cells and/or base stations cooperate with each other to support the UE.

That is, the present disclosure proposes a method of configuring a subband (SB) for channel state information (CSI) feedback and reporting SB CSI when a CoMP system (technique) in which a plurality of base stations transmit data to the UE in coordination with each other.

Meanwhile, in the present disclosure, the CSI reporting may be interpreted as reporting the CSI parameter calculated by the UE.

According to the current new RAT (NR) specification, the UE may be configured with one active bandwidth part (BWP) from (each) of (the plurality of) base stations. For a CoMP operation, when each of multiple base stations configures one active BWP in the UE, information (e.g., size or offset) of the BWP may be different. For example, a case where the UE is scheduled with the BWPs as follows in order to receive data from each of Control Resource Set (CORESET) 1 and CORESET 2 is described.

In this case, the UE receives the CORESET 1 from base station 1 and the UE receives CORESET 2 from base station 2.

i) DCI 1 from CORESET 1 (the size of active BWP1 is 50 RBs)

ii) DCI 2 from CORESET 2 (the size of active BWP2 is 100 RBs)

According to Table 5, the UE may be configured with the SB size of BWP1 as 4 or 8 from the base station through the higher layer and the SB size of BWP2 as 8 or 16.

In this case, when the configured SB size varies for each BWP, ambiguity may occur in frequency granularity of the UE for calculating a CSI (e.g., CRI/RI/PMI/CQI/LI/RSRP) parameter.

Accordingly, hereinafter, the present disclosure proposes a method for solving a problem in that since the SB sizes of the BWPs with which the UE is configured from the plurality of base stations are different from each other, the frequency granularity for calculating the CSI parameter becomes ambiguous.

Prior to describing a specific method, a scheme in which the base station configures the CoMP mode in the UE will be described. The base station may explicitly inform the UE of the CoMP mode through higher layer signaling (e.g., RRC or MAC CE) and/or dynamic signaling (e.g., DCI). The signal may be limited to the UE capable of performing the CoMP operation by capability reporting which the UE transmits to the base station, and the capability reporting may include information including whether to support the CoMP, a CoMP type, the number of base stations which may be transmitted by the CoMP, and the like.

As another scheme of notifying the CoMP mode, there is a scheme in which the UE implicitly recognizes/operates the CoMP mode. Such an implicit indication scheme may be indicated by one or a combination of the following schemes.

i. Case in which the base station configures/indicates two or more Demodulation Reference Signal (DMRS) groups to the UE ii. Case in which both transmission block (TB)/codeword (CW) is activated iii. Case in which RRC parameter nrofCQIsPerReport is configured to 2 iv. Case in which there are two or more QCL references for each DMRS group in the indicated Transmission Configuration Indicator (TCI) state v. Case in which the UE is configured with two or more downlink active BWPs in which the frequency and/or time domains overlap vi. Case in which frequency domains of CSI-RS bands (for CSI acquisition) in respective downlink active BWPs overlap vii. Case in which resource regions of the PDSCH scheduled from two or more DCIs overlap Here, the DMRS group represents a group of DMRS ports in which at least one of QCL types A/B/C/D is configured to be identical.

In addition to the scheme, the base station may implicitly know the CoMP type by using the component of the reported CSI with respect to information on whether the UE operates in JT, or operates in DPS or non-CoMP in the CoMP mode. For example, when the UE reports the CSI to the base station and the CSI contains information on two or more CRIs and information such as RI/PMI/CQI/LI corresponding thereto, the base station recognizes CoMP JT/operates in CoMP JT to perform data transmission to the UE, which is appropriate to the recognition/operation.

Hereinafter, the configuration to the CoMP mode means that the base station and/or the UE recognizes the CoMP/operates in CoMP by using explicit signaling or implicit signaling.

Hereinafter, the method for solving a problem in that since the SB sizes of the BWPs with which the UE is configured from the plurality of base stations are different from each other, the frequency granularity for calculating the CSI parameter becomes ambiguous will be described.

(Method 1)

When the UE is configured with or signaled with the CoMP mode, the UE does not expect that a plurality of corresponding base stations (TRxPs) are configured to different SB sizes. That is, if the sizes of the SBs are configured to be different from each other by the plurality of base stations, the UE may recognize that configuration information received from the base stations is not valid.

In addition, the UE does not expect that information on subcarrier spacing and/or normal/extend cyclic prefix which are the BWP configuration information is configured to be different from each other. Furthermore, the UE may expect that frequency location information (e.g., offset or BWP size) of the configured BWP is also configured to be the same. Therefore, in Method 1, it is preferable that the plurality of base stations signals flexibly configured CoMP information/resource without ambiguity for the frequency granularity for CoMP CSI parameter calculation of the UE. In this case, the UE may calculate the CSI parameter and the calculated CSI parameter to the plurality of base stations without the ambiguity.

Method 1 may be mainly applied to a case where all of the BWPs configured by the plurality of base stations overlap.

Schematic operation flows of the base station and the UE that perform Method 1 are as follows.

<Base Station Side>

Step 1: Step in which the (plural) base station transmits semi-static system and scheduling information (e.g., RRC) including the CoMP mode (e.g., explicit/implicit signaling) to the UE Step 2: Step in which the (plural) base station transmits the RS (e.g., SSB, CSI-RS, TRS, PT-RS) to the UE in order to receive a channel state report Step 3: Step of receiving a report for the channel state (e.g., CRI/RI/CQI/PMI/LI) from the UE Step 4: Step of exchanging all or some of information which the plural base stations receive from the UE Step 5: Step of calculating data scheduling and CoMP precoding by considering the channel state of the UE Step 6: Step of transmitting data to which the precoding is applied and RSs (e.g., DMRS, TRS, and PT-RS) for data decoding to a (scheduled) UE <UE Side>

Step 1: Step of being configured with the CoMP mode from the (plural) base station (e.g., through the explicit/implicit signaling)

Step 2: Step of receiving CSI reporting setting information and RS (e.g., SSB, CSI-RS, TRS, PT-RS) received from the (plural) base station Step 3: Step of calculating the CSI parameter based on the RS and the information (reporting setting information) configured from the base station, and reporting the CSI parameter to the base station Step 4: Step of receiving data from the base station according to data scheduling information Meanwhile, some steps in the operation flows on the base station and UE sides may be omitted.

(Method 2)

When the UE is configured with the CoMP mode from the base station, and configured with different SB sizes from multiple base stations, the UE may determine and calculate the frequency granularity for the CSI calculation by using a smallest size value or a largest size value among the configured SB sizes.

In the embodiment, when the SB size of BWP1 configured in CORESET 1 is 4 and the SB size of BWP2 configured in CORESET 2 is 8, in a case where the UE is configured in the CoMP mode or multiple active BWPs actively overlap, the UE automatically recognizes the CoMP mode/operates in the CoMP mode, and performs CoMP CSI parameter calculation by using a minimum value (e.g., 4) or a maximum value (e.g., 8) of the SB size.

When Method 2 is used, the UE recalculate/recognizes the frequency granularity for the CoMP CSI parameter calculation for CoMP information/resources flexibly configured by the plurality of base stations to calculate the CSI parameter without the ambiguity for the frequency granularity and report the calculated CSI parameter to the base station.

Such Method 2 may be mainly applied when the numbers of constituted RBs of the BWP configured from the plurality of base stations are the same as each other, but the SB sizes are different from each other and/or when the reporting SBs are different.

The operation of the base station that performs Method 2 is the same as the operation of the base station that performs Method 1, and a schematic operation flow of the operation of the UE that performs Method 2 is described below.

<UE Side>

Step 1: Step of being configured with the CoMP mode from the (plural) base station (e.g., through the explicit/implicit signaling)

Step 2: Step of receiving CSI reporting setting information and RS (e.g., SSB, CSI-RS, TRS, PT-RS) received from the (plural) base station Step 3: Step of calculating the information on the CSI reporting band based on the RS and the information (reporting setting information) configured from the base station Step 4: Step of calculating a CSI parameter corresponding to the CSI reporting band and reporting the CSI parameter to the base station Step 5: Step of receiving data from the base station according to data scheduling information Meanwhile, some steps in the operation flow on the UE side may be omitted.

(Method 3)

When the UE is configured in the CoMP mode from the base station and configured with two or more downlink active BWPs in which the resource regions overlap, and the CSI-RS resources for CSI acquisition in each downlink active BWP overlap in the frequency/time domain, the CSI report may be configured as one report setting, and integrated and reported, or configured as a plurality of report settings, and reported.

When Method 3 is used, the UE recalculate/recognizes the frequency granularity for the CoMP CSI parameter calculation for CoMP information/resources flexibly configured by the plurality of base stations to calculate the CSI parameter without the ambiguity for the frequency granularity and report the calculated CSI parameter to the base station.

Such Method 3 may be mainly applied when RB configurations of the BWP configured from the plurality of base stations are different from each other and the SB sizes are also different from each other.

The operation of the base station that performs Method 3 is the same as the operation of the base station that performs Method 1, and the operation of the UE is the same as the operation of the UE that performs Method 2.

(Method 3-1)

When the CSIs of BWP1 and BWP2 are configured to different reporting settings and fed back to the uplink resources, information received a specific TRxP (e.g., serving cell or lowest/highest cell id, or lowest/highest CSI report id) is prioritized for the location and/or size of the reporting SB and the CSI reporting for each TRxP follows SB granularity configured in each reporting setting.

FIG. 14 is a diagram illustrating an example of configuring a reporting subband set for CoMP to which the method proposed by the present disclosure is applicable.

Referring to FIG. 14, when Method 3-1 is used, only CSI parameters SBs 0 and 1 of BWP2 which overlaps with BWP1 are reported. That is, since parts in BWP2 which overlap with SBs 0 to 5 of BWP1 are SBs 0 and 1, only CSI parameters corresponding to SBs 0 and 1 of BWP2 may be reported. In this case, the base station may notify the reporting subband (set) by a bitmap scheme.

Meanwhile, only a part of the SB may overlap due to a difference in the RB size and/or the RB size configured in the BWP. For example, in the case of SB 1 of BWP2 which partially overlaps as illustrated in FIG. 14, the CoMP CSI parameter may be calculated and reported as in the following schemes a) and b). The operation of the corresponding UE may correspond to step 3 in the operation flows of the UE in Methods 2 and 3.

a) In the case of the CSI parameter report, the UE calculates the CSI parameter and reports the calculated CSI parameter by assuming only up to a frequency domain which accurately overlaps with the reporting SB set of BWP1 (i.e., an intersection of BWP1 and BWP2), for example, which corresponds to SBs 0, 1, 2, 3, 4, and 5 of BWP1 in FIG. 10 as a CoMP CSI parameter report region.

In this case, BWP1 is reported by calculating the CSI parameter in six CSI reporting SBs (SBs 0, 1, 2, 3, 4, and 5) and BWP2 is reported by calculating the CSI parameter in two CSI reporting SBs (SBs 0 and 1).

In this case, in the case of BWP2 SB1, a region where the CSI parameter is calculated is limited to frequency domains of SBs 4 and 5 of BWP1. Furthermore, in this case, the SB size may be determined as a specific value (e.g., the maximum/minimum value of the SB size of BWP1 and the SB size of BWP2) as in Method 2.

b) The UE may report a region which is a union of periods in which the reporting SB set entirely or partially overlaps by calculating the CoMP CSI parameter.

For example, as illustrated in FIG. 14, the region which is the union of the reporting SB set of BWP1 and the reporting SB set of BWP2 may be reported by performing CoMP CSI calculation (i.e., for all of SBs 0, 1, 2, 3, 4, 5, 6, and 7 of BWP1 or SBs 0 and 1 of BWP2).

In this case, in the case of PMIs for SBs 6 and 7 of BWP1, the CoMP CSI parameter of BWP2 may be calculated by assuming PMI used in a specific SB (e.g., closest SB (SB 5)) or the CoMP CSI parameter may be calculated by using best preferred PMIs of SBs 6 and 7 of BWP1. Therefore, in the case of BWP1, eight SB CSI reportings (SBs 0, 1,2, 3, 4, 5, 6, and 7) are performed and in the case of BWP2, two SB CSI reportings (SBs 0 and 1) are performed.

Meanwhile, when the union in the overlapped periods includes a part other than any one configured frequency domain of the BWP, CSI reporting for the part other than the configured frequency domain may be disregarded or may be excluded at the time of calculating the CSI parameter.

In the above-described method, in regard to the report for the CSI parameter for the frequency domain which does not overlap, the CSI parameter may be calculated and reported to the base station in a non-CoMP mode.

For example, as illustrated in FIG. 14, SBs 3 and 4 of BWP2 which are the reporting SBs do not overlap with the reporting SB of BWP1, and the UE may calculate and report the CSI parameter in the non-CoMP mode for SBs 3 and 4 of BWP2.

In this case, CSI parameters of a wideband (WB) attribute such as RI/CQI may be additionally recalculated and reported for the non-CoMP mode or reported as one representative value (e.g., based on CoMP CSI) for the entire CSI report region.

Meanwhile, when each downlink BWP for CSI parameter measurement and/or data reception is the same as the uplink BWP having a pair relationship with the downlink BWP, and the uplink resource for CSI feedback overlaps, the UE may follow the following operations and correspond to step 4 in the operation flows of the UE in Methods 2 and 3.

i) If all respective CSI reports performed between the plurality of base stations and the UE are PUCCH based CSI reports, when the uplink resources overlap on the time axis or the uplink resources collide with each other, the CSI report may be transmitted to multi-CSI PUCCH of the corresponding uplink BWP. In this case, the inter-resource collision means a case where even some of the time/frequency resources of each uplink resource overlap.

Here, the corresponding CoMP CSIs have a higher priority than the non-CoMP CSI (CSI for acquisition and/or beam management).

ii) When each CSI report performed between the plurality of base stations and the UE includes even one PUSCH based report, PUCCH based reports which overlap at the time of the overlapping may be piggybacked and transmitted onto the PUSCH. Meanwhile, when all PUSCH based reports are not included in the PUSCH resource, CSI which is dropped or omitted due to a low priority according to the CSI priority may be piggybacked to the PUSCH.

Meanwhile, when each downlink BWP for measurement of the CSI parameter and/or data reception and an uplink BWP having the pair relationship with the downlink BWP are different, and the uplink resources for the CSI feedback overlap, the UE may follow the following operations. The operation of the UE may correspond to step 4 in the operation flows of the UE in Methods 2 and 3.

i) When all respective CSI reports performed between the plurality of base stations and the UE are the PUCCH based CSI reports, the PUCCH based reports which overlap at the time when the uplink resources overlap may be piggybacked to the multi-CSI PUCCH of a specific uplink BWP and reported to the base station. In this case, the specific uplink BWP may be promised in advance (e.g., an uplink BWP corresponding to a lowest CORESET index) or configured through the higher layer (e.g., RRC or MAC CE) or by dynamic signaling (e.g., DCI) by the base station.

ii) When each CSI report performed between the plurality of base stations and the UE includes even one PUSCH based report, PUCCH based reports which overlap at the time of the overlapping may be piggybacked and transmitted onto the PUSCH of the uplink BWP including the PUSCH based report. Meanwhile, when all PUSCH based reports are not included in the PUSCH resource, CSI which is dropped or omitted due to a low priority according to the CSI priority may be piggybacked to the PUSCH.

In the case of i) and ii), the base station(s) exchange/use the reporting setting information configured in the UE (e.g., overhear the CSI report of the UE to another base station) and decode the CSI report of the UE.

(Method 3-2)

When information for calculating the CSI parameters of BWP1 and BWP2 is configured by one integrated reporting setting, the UE does not expect that the reporting SB set configured for the CSI report deviates from a frequency domain range of each downlink BWP configured for CSI measurement/calculation.

As in Method 3-2, when the CSI report is configured by one integrated reporting setting, the SB size and/or the information of the reporting SB set may be independently configured for each BWP. In this case, the CSI parameter calculation and/or reporting scheme of Method 3-1 may be applied. When each independent configuration is used, a time domain behavior of the CSI report (i.e., the CSI report is performed periodically, semi-persistently, and aperiodically) may be independently configured for each BWP for scheduling flexibility between the base stations.

FIG. 15 is a diagram illustrating another example of configuring a reporting subband set for CoMP to which the method proposed in the present disclosure is applicable.

Meanwhile, when the CoMP CSI report is configured in one reporting setting as in Method 3-2, if the SB size for each BWP is different, there is a problem in that regions including the reporting SB sets may be different from each other by one bitmap as illustrated in FIG. 15.

For example, when SBs of indexes 0 to 5 are configured to reporting SBs through one bitmap as illustrated in FIG. 15, the SB sizes of BWP1 and BWP2 are different from each other and the regions including the reporting SB set are thus rent from each other. That is, the RB of BWP2 and the RB of BWP1 are different from each other and the SB sizes configured from the base station are thus different from each other (in FIG. 15, the SB of BWP2 is configured to be larger, and as a result, there is a difference in frequency domain in which the CSI parameter is calculated between BWP1 and BWP2.

The operation of the base station that configures the corresponding resource/reporting setting information in the UE of Method 3-2 may correspond to step 1 of the base station operation flows in Methods 1 and 3.

Hereinafter, embodiments for solving the problem in that the frequency domains where the CSI parameter is calculated are different will be described.

Embodiment 1

$$\text{Bitmap size}=\max(BW\_BWP1,BW\_BWP2)/\min(SB\_size\_BWP1,SB\_size\_BWP2) \quad \text{[Equation 2]}$$

$$\text{Bitmap granularity}=\min(SB\_size\_BWP1,SB\_size\_BWP2) \quad \text{[Equation 3]}$$

Equation 2 is an equation for determining a bitmap size and Equation 3 is an equation for determining bitmap granularity.

For example, in the case of FIG. 15, BWP1 is constituted by 50 RBs and the SB size is 4, and BWP2 is constituted by 100 RBs and the SB size is 8. Therefore, a numerator part of Equation 2 becomes 100 which is the larger value of BWP1 and BWP2 and the numerator part becomes 4 which is the smaller SB size value. That is, the bitmap size becomes 100/4=25 and similarly, according to Equation 3, the bitmap granularity becomes 4.

The bitmap is a scheme configured to cover the entire union of BWP1 and BWP2 and in FIG. 15, it is assumed that frequency location offset values of respective BWPs are the same as each other, but when the offset values are different from each other, the numerator part of the bitmap size of Equation 2 may be replaced as shown in Equation 4 below.

Embodiment 2

$$\text{Bitmap size}=\{\max(end\_RB\_BWP1,end\_RB\_BWP2)-\min(start\_RB\_BWP1,start\_RB\_BWP2)\}/\min(SB\_size\_BWP1,SB\_size\_BWP2) \quad \text{[Equation 4]}$$

Here, start_RB and end_RB mean a start RB index and an end RB index of each BWP, respectively.

The UE does not expect that the bitmap configured by using Embodiment 1 or 2 described above indicates a region other than the frequency domain (e.g., both BWP1 and BWP2 of FIG. 28) of the BWP configured for data reception.

Alternatively, when the bitmap indicates the regions other than the frequency domain of any one BWP configured for data reception, it may be promised that the CoMP CSI reporting for the corresponding region is not performed. That is, when the bitmap indicates a region other than the corresponding intersection of the frequency domain of each configured BWP, CSI reporting for the region other than the corresponding intersection may not be performed.

(Method 3-3)

When the CSIs of BWP1 and BWP2 are configured to different reporting settings or one integrated reporting setting and/or fed back to the uplink resources, WB CSI is reported regardless of the SB size configured by the reporting setting.

The operation of the UE that performs Method 3-3 may correspond to steps 3 and 4 in the operation flows of the UE in Methods 2 and 3. In other words, an operation of the UE for calculating the reporting band corresponds to step 3 and an operation of calculating and reporting the WB CSI for the corresponding band corresponds to step 4.

In the case of Method 3-3, the bandwidth or band for reporting the WB CSI may be configured/defined as follows.

i) Intersection of a CSI-RS band of BWP1 and the CSI-RS band of BWP2 ii) Union of the CSI-RS band of BWP1 and the CSI-RS band of BWP2 iii) Intersection of reporting SB sets configured by the CSI report setting iv) Union of reporting SB sets configured by the CSI report setting The methods described in the present disclosure may be applied to a CoMP configuration scheme through the configuration of a plurality of CORESETS for one active downlink BWP in addition to a case where the plurality of base stations configure (a plurality of) CORESETs, respectively and a plurality of active downlink BWPs are thus configured. That is, the methods may be applied to a case where the plurality of base stations indicate/apply the CoMP operation through data scheduling and CSI report setting by different CORESETs for one active BWP.

As described above, in the case of the CSI feedback for the CoMP, the CSI report may be periodic/aperiodic/semi-persistent.

FIG. 16 is a flowchart showing an example of periodic CSI reporting to which the method proposed in the present disclosure is applicable.

According to FIG. 16, it is assumed that PUCCH resource 1 is transmitted TRP 1 and PUCCH resource 2 is transmitted to TRP 2 and it is assumed that a transmission cycle of PUCCH resource 1 is twice the transmission cycle of PUCCH resource 2.

In the case of the current NR, when two PUCCH resources overlap on the time and/or frequency axis, the UE regards that a colliding case occurs and applies a priority rule to transmit one PUCCH resource.

When a multi-CSI PUCCH is configured, the UE determines whether two PUCCHs may be included in the multi-CSI PUCCH (two PUCCHs may be carried) and then if two PUCCHs may be included in the multi-CSI PUCCH (if two PUCCHs can be transmitted through resources configured in multi-CSIs), two PUCCHs may be transmitted as the multi-CSI PUCCH and if two PUCCHs may not be included, only one PUCCH may be included in the multi-CSIs and transmitted according to the priority rule.

In such CoMP transmission, it is not preferable that one PUCCH is dropped. That is, as illustrated in FIG. 16, when the priority of the PUCCH resource transmitted to a specific TRP is low, a problem may occur in which the PUCCH resource having the low priority is continuously dropped. Hereinafter, methods for solving such a problem will be described.

(Method 4)

In a UE that is configured/operates in CoMP (e.g., joint transmission (JT) mode) through explicit/implicit signaling, the PUCCH CSI report including (carrying) the CoMP CSI may have the highest priority.

Similar to Method 4, the PUCCH CSI report including the CoMP CSI may have a higher priority than a general PUCCH resource.

(Method 5)

The UE which is configured/operates in the CoMP through the explicit/implicit signaling does not expect that resources including the CSI report transmitted to each TRP collide on the time/frequency domain at the time of the CSI feedback for data transmission.

(Method 6)

As illustrated in FIG. 16, when the UE reports the CSI with different cycles, the UE reports the CSI parameter calculated for CoMP transmission only to the PUCCH resource reported at the same time, and in the case of the PUCCH transmitted at the time when there is no collision, the UE may report the CSI parameter calculated for CSI for CSI for non-CoMP.

(Method 7)

When Multi-CSI PUCCH is configured, PUCCH resources for CoMP may be transmitted while being loaded on multi-CSI PUCCH even if no collision occurs, and at this time, on a Tx (Panel id) end of the UE corresponding to the TRP (panel) configured with the multi-CSI PUCCH, the multi-CSI PUCCH may be transmitted to each TRP.

Similar to Method 7, when the Multi-CSI PUCCH is configured, in order to obtain a diversity gain, the same multi-CSI PUCCH may be transmitted to the TRP at the same timing on each Tx (Panel id) end of the UE corresponding to each TRP (panel).

Priority Rules for CSI Reports

The CSI reports are related to a priority value $Pri_{iCSI}(y, k, c, s) = 2 \cdot N_{cells} \cdot M_s \cdot y + N_{cells} \cdot M_s \cdot k + M_s \cdot c + s$.

In the case of aperiodic CSI reports carried on the PUSCH, y=0, in the case of semi-persistent CSI reports carried on the PUSCH, y=1, and in the case of semi-persistent CSI reports carried on the PUCCH, y=2, and in the case of periodic CSI reports carried on the PUCCH, y=3.

In the case of CSI reports including L1-RSRP, k=0 and in the case of CSI reports not including L1-RSRP, k=1.

c represents a serving cell index and $N_{cells}$ represents a value of a higher layer parameter maxNrofServingCells.

s represents reportConfigID and $M_s$ represents a value of a higher layer parameter maxNrofCSI-ReportConfigurations.

When a value of $Pri_{iCSI}(y,k,c,s)$ in the first CSI report is smaller than $Pri_{iCSI}(y,k,c,s)$ in a second CSI report, the first CSI report has a higher priority than the second CSI report.

When time occupancies of physical channels scheduled to include the CSI report overlap in at least one OFDM symbol and transmitted on the same carrier, it may be considered that two CSI reports collide with each other. When the UE is configured to transmit two CSI reports which collide with each other, except for a case where the y value of one CSI report is 2 and the y value of the other CSI report is 3, when the y values of both CSI reports are different, the following rule may be applied (3GPP TS38.214 5.2.3, 5.2.4).

A CSI report having a higher priority value $Pri_{iCSI}(y,k,c,s)$ is not transmitted by the UE.

Otherwise, two CSI reports may be multiplexed or dropped based on the priority value.

When the semi-permanent CSI report transmitted on the PUSCH overlaps in time with the transmission of PUSCH data in one or more symbols, and when the earliest symbol of the PUSCH channels starts earlier than the N2+d2, 1 symbol after the last symbol of the DCI scheduling the PUSCH, the CSI report may not be transmitted by the UE.

Otherwise, when a timeline requirement is not satisfied, this case may be an error case.

When the UE transmits the first PUSCH including semi-permanent CSI reports, transmits the second PUSCH including the UL-SCH, and the first PUSCH transmission and the second PUSCH transmission overlap in time, the UE may not transmit the first PUSCH and the second PUSCH. The UE expects that the first and second PUSCH transmission will satisfy the timing condition for temporally overlapping PUSCH transmission will be satisfied when at least one of the first or second PUSCH transmission responds to DCI format detection by the UE.

The UE receives semi-static or dynamic signaling (DCI) and RS(s) through the RF unit, and decodes the semi-static signaling and dynamic signaling through a UE processor, and decodes control information and RS for the CoMP operation, calculates the corresponding CSI and stores the calculated CSI in a memory, and then transmits the stored CSI to the base station through the RF unit. Thereafter, the UE receives the DCI through the RF unit and then decodes the DCI through the UE process and blind-decodes the DMRS port and then performs data decoding. In this process, the UE may use the memory and stores the decoded data in the memory.

The base station transmits semi-static or dynamic signaling for the CoMP configuration to the UE by using the base station RF unit. When the UE does not perform a wireless connection operation for a predetermined time, the UE may perform a DRX operation to be described below.

The base station transmits semi-static or dynamic signaling for the CoMP configuration to the UE by using the base station RF unit. Thereafter, the base station receives the CSI from the UE by using the RF unit and performs scheduling based on the CSI through the base station processor. In this process, the base station may use the memory and stores the calculated scheduling result in the memory. Thereafter, the base station transmits the DCI and the data through the RF unit. The base station stores data to be transmitted in the memory, and performs scheduling for data signal transmission and performs DCI encoding through the processor. Thereafter, the base station transmits the data and the DCI through the RF unit. When the UE does not perform the wireless connection operation for a predetermined time, the UE may perform the DRX operation to be described below and the base station may transmit DRX related configuration information to the UE.

The base station configures the CoMP mode in the UE by using the signaling technique for the CoMP CSI feedback and the UE measures and calculates the CSI by using the information configured as the CoMP, and reports the CSI to the base station. The base station transmits data by using the CSI, and when the data is successfully transmitted, the UE follows an operation of DRX to be described below for the purpose such as battery saving of the UE, etc.

Discontinuous Reception (DRX) Operation

Discontinuous Reception (DRX) means an operation mode of allowing the UE to reduce battery consumption so as for the UE to discontinuously receive a downlink channel. In other words, a UE in which the DRX is configured discontinuously receives a DL signal to reduce power consumption. A DRX operation is performed in a DRX cycle representing a time interval in which On Duration is periodically repeated and the DRX cycle includes the On Duration and a slip interval (alternatively, Opportunity for DRX). The On Duration represents a time interval which the UE monitors in order to receive the PDCCH. The DRX may be performed in a Radio Resource Control (RRC)_IDLE state (or mode), an RRC_INACTIVE state (or mode), and an RRC_CONNECTED state (or mode). In the RRC_IDLE state and the RRC_INACTIVE state, the DRX is used for discontinuously receiving a paging signal.

RRC_Idle state: State in which a wireless connection (RRC connection) is not configured between the base station and the UE.

RRC Inactive state: State in which the wireless connection (RRC connection) is configured between the base station and the UE, but the wireless connection is inactivated.

RRC_Connected state: State in which the wireless connection (RRC connection) is configured between the base station and the UE.

The DRX is generally divided into Idle mode DRX, Connected DRX(C-DRX), and extended DRX, and DRX applied in the IDLE state is referred to as Idle mode DRX and DRX applied in the CONNECTED state is referred to as Connected mode DRX (C-DRX).

Extended/enhanced DRX (eDRX) as a mechanism capable of extending cycles of Idle mode DRX and C-DRX may be primarily used for application of (massive) IoT. Whether the eDRX is permitted in the Idle mode DRX may be configured by system information (e.g., SIB1). The SIB1 may include an eDRX-Allowed parameter and the eDRX-Allowed parameter is a parameter representing whether Idle mode extended DRX is permitted.

Idle Mode DRX

In the Idle mode, the UE may use the DRX in order to reduce the power consumption. One paging occasion (PO) is a subframe in which Paging-Radio Network Temporary Identifier (P-RNTI) may be transmitted on PDCCH, MPDCCH, or NPDCCH of addressing a paging message for NB-IoT. In the P-RNTI transmitted on the MPDCCH, the PO represents a start subframe of MPDCCH repetition. In the case of the P-RNTI transmitted on the NPDCCH, the PO indicates a start subframe of NPDCCH repetition when a subframe determined by the PO is not a valid NB-IoT downlink subframe. Then, a first valid NB-IoT downlink subframe after the PO is a start subframe of NPDCCH repetition.

One paging frame (PF) is one radio frame which may include one or multiple paging occasions. When the DRX is used, the UE needs to monitor only one PO per DRX cycle. One paging narrowband (PNB) is one narrowband in which the UE receives the paging message. The PF, the PO, and the PNB may be determined based on the DRX parameters provided in the system information.

FIG. 17 is a flowchart showing an example of a method of performing an Idle mode DRX operation.

The UE receives Idle mode DRX configuration information from the base station through higher layer signaling (e.g., system information) (S110).

In addition, the UE determines a Paging Frame (PF) for monitoring a physical downlink control channel (e.g., PDCCH) in a DRX cycle and a Paging Occasion (PO) in the PF based on the Idle mode DRX configuration information (S120). Here, the DRX cycle includes On duration and a sleep interval (alternatively, Opportunity for DRX).

In addition, the UE monitors the PDCCH in the PO of the determined PF (S130). The UE monitors only one subframe (PO) per paging DRX cycle.

Additionally, when the UE receives a PDCCH scrambled by P-RNTI for On duration (i.e., when detecting paging), the UE transitions to a connected mode to transmit and receive data to and from the base station.

FIG. 18 is a diagram illustrating an example of an Idle mode DRX operation.

Referring to FIG. 18, when traffic destined for a UE in an RRC_Idle state (hereinafter, referred to as an 'Idle state') occurs, paging occurs to the corresponding UE. The UE wakes up periodically, i.e., every (paging) DRX cycle and monitors the PDCCH. When there is the paging, the UE transitions to a Connected state and receives data and when there is no paging, the UE enters a sleep mode again.

Connected Mode DRX (C-DRX)

C-DRX may be DRX applied in an RRC Connected state and a DRX cycle of the C-DRX may be constituted by a Short DRX cycle and/or a Long DRX cycle. The Short DRX cycle is optional. When the C-DRX is configured, the UE monitors the PDCCH for On Duration. When there is a PDCCH which is successfully detected while monitoring the PDCCH, the UE operates an inactivity timer and maintains an awake state. On the contrary, when there is no PDCCH which is successfully detected while monitoring PDCCH, the UE enters a sleep state after the On Duration ends. When the C-DRX is configured, a PDCCH reception occasion (e.g., a slot having a PDCCH search space) may be discontinuously configured according to the C-DRX configuration. On the contrary, when the C-DRX is not configured, the PDCCH reception occasion (e.g., the slot having the PDCCH search space) may be continuously configured. Meanwhile, regardless of whether the C-DRX is configured, PDCCH monitoring may be limited in a time interval configured as a measurement gap.

FIG. 19 is a flowchart showing an example of a method of performing a C-DRX operation.

The UE receives from the eNB RRC signaling (e.g., MAC-MainConfig IE) including DRX configuration information (S310). The DRX configuration information may include the following information.

onDurationTimer: The number of PDCCH subframes to be continuously monitored a start part of the DRX cycle drx-InactivityTimer: The number of PDCCH subframes to be continuously monitored when the UE decodes PDCCH having scheduling information drx-RetransmissionTimer: The number of PDCCH subframes to be continuously monitored when HARQ retransmission is predicted longDRX-Cycle: On Duration occurrence cycle drxStartOffset: subframe number in which the DRX cycle starts drxShortCycleTimer: The number of times of short DRX cycle shortDRX-Cycle: DRX cycle which operates at the number of times of drxShortCycleTimer when Drx-InactivityTimer is terminated In addition, when DRX 'ON' is configured through a DRX command of MAC command element (CE) (S320), the UE monitors the PDCCH for ON duration of the DRX cycle based on the DRX configuration (S330).

FIG. 20 is a diagram illustrating an example of a C-DRX operation.

Referring to FIG. 20, when the UE receives scheduling information (e.g., DL Grant) in an RRC_Connected state (hereinafter, referred to as Connected state), the UE drives a DRX inactivity timer and an RRC inactivity timer.

When the DRX inactivity timer expires, a DRX mode starts and the UE wakes up at the DRX cycle and monitors the PDCCH for a predetermined time (on duration timer). Here, when Short DRX is configured, the UE starts with a short DRX cycle when starting the DRX mode and when the short DRX cycle ends, the UE enters a long DRX cycle. The long DRX cycle is a multiple of the short DRX cycle and the UE wakes up more frequently in the short DRX cycle. When the RRC inactivity timer expires, the UE transitions to the Idle state and performs the Idle mode DRX operation.

IA/RA+DRX Operation

FIG. 21 is a diagram illustrating an example of power consumption depending on a state of a UE.

Referring to FIG. 21, after power on, the UE performs Boot Up for application loading, an initial access/random access procedure for synchronizing downlink and uplink with the base station, a registration procedure with the network, etc., and current (or power consumption) consumed while performing each procedure is illustrated in FIG. 21. When the transmission power of the UE is high, current consumption of the UE increases. In addition, when there is no traffic transmitted to the UE or to be transmitted to the base station, the UE transitions to the Idle mode and performs the Idle mode DRX operation. In addition, when paging (e.g., call occurrence) occurs during the Idle mode DRX operation, the UE transitions to the Connected mode to the Idle mode through a cell establishment procedure and transmits and receives data to and from the base station. In addition, when there is no data which the UE transmits and receives to and from the base station in the connected mode for a specific time or at a configured time, the UE performs the connected DRX (C-DRX) operation.

In addition, when the extended DRX (eDRX) is configured through the higher layer signaling (e.g., system information), the UE may perform the eDRX operation in the Idle mode or Connected mode.

Each embodiment or each method described above may be performed separately, and is performed by a combination of one or more embodiments or methods to implement the method proposed in the present disclosure.

The base station/UE described in the present disclosure is just an example and may be replaced with various devices described in FIGS. 23 to 26, and applied.

FIG. 22 is a flowchart showing an example of an operation method of a UE that performs a CSI reporting configuration method proposed in the present disclosure.

First, a UE receives Discontinuous Reception (DRX) configuration information from a first base station and a second base station (S2210).

The UE receives first configuration information related to Channel State Information (CSI) report of a first Bandwidth Part (BWP) from the first base station and second configuration information related to a CSI report of a second BWP from the second base station (S2220).

The first BWP may be composed of a plurality of first subbands including at least one first subband for the CSI report.

The second BWP may be composed of a plurality of second subbands including at least one second subband for the CSI report.

The first configuration information and the second configuration information may be received only during a specific time based on the DRX configuration information.

When the at least one first subband and the at least one second subband partially or entirely overlap, the UE obtains a first CSI for overlapping at least one subband (S2230).

The UE reports the first CSI to the first base station and the second base station (S2240).

In claim 1, when the at least one first subband and the at least one second subband entirely overlap, the at least one subband may be the at least one first subband or the at least one second subband, a size of the first BWP and the a size of second BWP may be same, and each of a size of the at least one first subband and a size of the at least one second subband may be same.

When a size of the at least one first subband and a size of the at least one second subband are set differently for each other, the UE may recognize that the first configuration information and the second configuration information are not valid.

The first configuration information may include a first size value for a plurality of first subbands, and the second configuration information may include a second size value for a plurality of second subbands.

When the at least one first subband and the at least one second subband partially overlap, the at least one subband may be calculated based on a smaller or larger value of the first size value and the second size value.

When the at least one first subband and the at least one second subband partially overlap and the first size value is less than the second size value, the at least one subband may be determined based on the at least one first subband or the at least one second subband.

After step S2240, the UE may obtain a second CSI for remaining subbands except for the at least one subband among the at least one first subband; and transmit the second CSI to the first base station.

In addition, the UE may obtain a second CSI for remaining subbands except for the at least one subband among the at least one second subband; and transmit the second CSI to the second base station.

The at least one first subband and the at least one second subband may be indicated through a bitmap.

The first configuration information and the second configuration information may be transmitted to the UE based on a CoMP mode, the CoMP mode may be indicated to the UE through an explicit or implicit method, and in the implicit method, the UE may recognize the CoMP mode when a specific condition is satisfied.

In this case, the specific condition may be a case that two or more DMRS (Demodulation Reference Signal) groups are set to the terminal from the first base station and the second base station, a case that a QCL (Quasi Co-Located) reference signal indicated by a Transmission Configuration Indicator (TCI) received from the first base station and the second base station is 2 or more, a case that some or all of active BWPs respectively set from the first base station and the second base station overlap, a case that some or all of reference signals (RS) for CSI measurement set in each of the active BWPs overlap in the frequency domain, or a case that some or all of the resource regions of a physical downlink shared channel (PDSCH) each received from the first base station and the second base station overlap.

Referring to FIGS. 24 and 25, contents in which a method of reporting Channel State Information (CSI) in a system proposed in the present disclosure is implemented in a UE device will be described.

A UE reporting Channel State Information (CSI) in a Coordinate Multi-Point (CoMP) system may include a radio frequency (RF) module transmitting and receiving a radio signal; and a processor functionally connected to the RF module.

First, the processor of the UE controls the RF module to receive Discontinuous Reception (DRX) configuration information from a first base station and a second base station.

The processor controls the RF module to receive first configuration information related to Channel State Information (CSI) report of a first Bandwidth Part (BWP) from the first base station and second configuration information related to a CSI report of a second BWP from the second base station.

The first BWP may be composed of a plurality of first subbands including at least one first subband for the CSI report.

The second BWP may be composed of a plurality of second subbands including at least one second subband for the CSI report.

The first configuration information and the second configuration information may be received only during a specific time based on the DRX configuration information.

When the at least one first subband and the at least one second subband partially or entirely overlap, the processor controls the RF module to obtain a first CSI for overlapping at least one subband.

The processor controls the RF module to report the first CSI to the first base station and the second base station.

When the at least one first subband and the at least one second subband entirely overlap, the at least one subband may be the at least one first subband or the at least one second subband, a size of the first BWP and the a size of second BWP may be same, and each of a size of the at least one first subband and a size of the at least one second subband may be same.

When a size of the at least one first subband and a size of the at least one second subband are set differently for each other, the UE may recognize that the first configuration information and the second configuration information are not valid.

The first configuration information may include a first size value for a plurality of first subbands, and the second configuration information may include a second size value for a plurality of second subbands.

When the at least one first subband and the at least one second subband partially overlap, the at least one subband may be calculated based on a smaller or larger value of the first size value and the second size value.

When the at least one first subband and the at least one second subband partially overlap and the first size value is less than the second size value, the at least one subband may be determined based on the at least one first subband or the at least one second subband.

The processor controls the RF module to obtain a second CSI for remaining subbands except for the at least one subband among the at least one first subband; and transmit the second CSI to the first base station.

The processor controls the RF module to transmit the second CSI to the first base station.

The processor controls the RF module to obtain a second CSI for remaining subbands except for the at least one subband among the at least one second subband.

The processor controls the RF module to transmit the second CSI to the second base station.

The at least one first subband and the at least one second subband may be indicated through a bitmap.

The first configuration information and the second configuration information may be transmitted to the UE based on a CoMP mode, the CoMP mode may be indicated to the UE through an explicit or implicit method, and in the implicit method, the UE may recognize the CoMP mode when a specific condition is satisfied.

In this case, the specific condition may be a case that two or more DMRS (Demodulation Reference Signal) groups are set to the terminal from the first base station and the second base station, a case that a QCL (Quasi Co-Located) reference signal indicated by a Transmission Configuration Indicator (TCI) received from the first base station and the second base station is 2 or more, a case that some or all of active BWPs respectively set from the first base station and the second base station overlap, a case that some or all of reference signals (RS) for CSI measurement set in each of the active BWPs overlap in the frequency domain, or a case that some or all of the resource regions of a physical downlink shared channel (PDSCH) each received from the first base station and the second base station overlap.

Example of Communication System to Which Present Disclosure is Applied

Although not limited thereto, but various descriptions, functions, procedures, proposals, methods, and/or operation flowcharts of the present disclosure, which are disclosed in the present disclosure may be applied to various fields requiring wireless communications/connections (e.g., 5G) between devices.

Hereinafter, the communication system will be described in more detail with reference to drawings. In the following drawings/descriptions, the same reference numerals will refer to the same or corresponding hardware blocks, software blocks, or functional blocks if not differently described.

FIG. 23 illustrates a communication system 1 applied to the present disclosure.

Referring to 23, a communication system 1 applied to the present disclosure includes a wireless device, a base station, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 10000a, vehicles 10000b-1 and 10000b-2, an eXtended Reality (XR) device 10000c, a hand-held device 10000d, a home appliance 10000e, an Internet of Thing (IoT) device 10000f, and an AI device/server 40000. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the base station and the network may be implemented even the wireless device and a specific wireless device 20000a may operate a base station/network node for another wireless device.

The wireless devices 10000a to 10000f may be connected to a network 30000 through a base station 20000. An artificial intelligence (AI) technology may be applied to the wireless devices 10000a to 10000f and the wireless devices 10000a to 10000f may be connected to an AI server 40000 through the network 30000. The network 30000 may be configured by using a 3G network, a 4G (e.g., LTE) network, or a 5G (e.g., NR) network. The wireless devices 10000a to 10000f may communicate with each other through the base station 20000/network 30000, but may directly communicate with each other without going through the base station/ network (sidelink communication). For example, the vehicles 10000b-1 and 10000b-2 may perform direct communication (e.g., Vehicle to Vehicle (V2V)/Vehicle to everything (V2X) communication). Furthermore, the IoT device (e.g., sensor) may perform direct communication with other IoT devices (e.g., sensor) or other wireless devices 10000a to 10000f.

Wireless communications/connections 15000a, 15000b, and 15000c may be made between the wireless devices 10000a to 10000f/the base station 20000 and between the base station 20000 and the base station 20000. Here, the wireless communication/connection may be made through various wireless access technologies (e.g., 5G NR) such as uplink/downlink communication 15000a, sidelink communication 15000b (or D2D communication), and inter-base station communication 15000c (e.g., relay, Integrated Access Backhaul (IAB)). The wireless device and the base station/the wireless device and the base station and the base station may transmit/receive radio signals to/from each other through wireless communications/connections 15000a, 15000b, and 15000c. For example, the wireless communications/connections 15000a, 15000b, and 15000c may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

Example of Wireless Device to Which Present Disclosure is Applied

FIG. 24 illustrates a wireless device applicable to the present disclosure.

Referring to FIG. 24, a first wireless device 2100 and a second wireless device 2200 may transmit/receive radio signals through various wireless access technologies (e.g., LTE and NR). Here, the first wireless device 2100 and the second wireless device 2200 may correspond to a wireless device 10000x and a base station 20000 and/or a wireless device 10000x and a wireless device 10000x of FIG. 23.

The first wireless device 2100 may include one or more processors 2102 and one or more memories 2104 and additionally further include one or more transceivers 2106 and/or one or more antennas 2108. The processor 2102 may control the memory 2104 and/or the transceiver 2106 and may be configured to implement descriptions, functions, procedures, proposals, methods, and/or operation flows disclosed in the present disclosure. For example, the processor 2102 may process information in the memory 2104 and generate a first information/signal and then transmit a radio signal including the first information/signal through the transceiver 2106. Furthermore, the processor 2102 may receive a radio signal including a second information/signal through the transceiver 2106 and then store in the memory 2104 information obtained from signal processing of the second information/signal. The memory 2104 may connected to the processor 2102 and store various information related to an operation of the processor 2102. For example, the memory 2104 may store a software code including instructions for performing some or all of processes controlled by the processor 2102 or performing the descriptions, functions, procedures, proposals, methods, and/or operation flowcharts disclosed in the present disclosure. Here, the processor 2102 and the memory 2104 may be a part of a communication modem/circuit/chip designated to implement the wireless communication technology (e.g., LTE and NR). The transceiver 2106 may be connected to the processor 2102 and may transmit and/or receive the radio signals through one or more antennas 2108. The transceiver 2106 may include a transmitter and/or a receiver. The transceiver 2106 may be used mixedly with a radio frequency (RF) unit. In the present disclosure, the wireless device may mean the communication modem/circuit/chip.

The second wireless device 2200 may include one or more processors 2202 and one or more memories 2204 and additionally further include one or more transceivers 2206 and/or one or more antennas 208. The processor 2202 may control the memory 2204 and/or the transceiver 2206 and may be configured to implement descriptions, functions, procedures, proposals, methods, and/or operation flows disclosed in the present disclosure. For example, the processor 2202 may process information in the memory 2204 and generate a third information/signal and then transmit a radio signal including the third information/signal through the transceiver 2206. Furthermore, the processor 2202 may receive a radio signal including a fourth information/signal through the transceiver 2206 and then store in the memory 2204 information obtained from signal processing of the fourth information/signal. The memory 2204 may connected to the processor 2202 and store various information related to an operation of the processor 2202. For example, the memory 2204 may store a software code including instructions for performing some or all of processes controlled by the processor 2202 or performing the descriptions, functions, procedures, proposals, methods, and/or operation flowcharts disclosed in the present disclosure. Here, the processor 2202 and the memory 2204 may be a part of a communication modem/circuit/chip designated to implement the wireless communication technology (e.g., LTE and NR). The transceiver 2206 may be connected to the processor 2202 and may transmit and/or receive the radio signals through one or more antennas 2208. The transceiver 2206 may include a transmitter and/or a receiver. The transceiver 2206 may be used mixedly with a radio frequency (RF) unit. In the present disclosure, the wireless device may mean the communication modem/circuit/chip.

Hereinafter, hardware elements of the wireless devices 2100 and 2200 will be described in more detail. Although not limited thereto, one or more protocol layers may be implemented by one or more processors 2102 and 2202. For example, one or more processors 2102 and 2202 may implement one or more layers (e.g., functional layers such as PHY, MAC, RLC, PDCP, RRC, and SDAP). One or more processors 2102 and 2202 may generate one or more protocol data units (PDUs) and/or one or more service data units (SDUs) according to the descriptions, functions, procedures, proposals, methods, and/or operation flowcharts disclosed in the present disclosure. One or more processors 2102 and 2202 may generate a message, control information, data, or information according to the descriptions, functions, procedures, proposals, methods, and/or operation flowcharts disclosed in the present disclosure. One or more processors 2102 and 2202 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 2106 and 2206. One or more processors 2102 and 2202 may receive the signal (e.g., baseband signal) from one or more transceivers 2106 and 2206 and acquire the PDU, the SDU, the message, the control information, the data, or the information according to the descriptions, functions, procedures, proposals, methods, and/or operation flowcharts disclosed in the present disclosure.

One or more processors 2102 and 2202 may be referred to as a controller, a microcontroller, a microprocessor, or a microcomputer. One or more processors 2102 and 2202 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 2102 and 2202. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 2102 and 2202 or stored in one or more memories 2104 and 2204 and driven by one or more processors 2102 and 2202. The descriptions, functions, procedures, proposals, and/or operation flowcharts disclosed in the present disclosure may be implemented by using firmware or software in the form of a code, the instruction and/or a set form of the instruction.

One or more memories 2104 and 2204 may be connected to one or more processors 2102 and 2202 and may store various types of data, signals, messages, information, programs, codes, instructions, and/or commands. One or more memories 2104 and 2204 may be configured by a ROM, a RAM, an EPROM, a flash memory, a hard drive, a register, a cache memory, a computer reading storage medium, and/or a combination thereof. One or more memories 2104 and 2204 may be positioned inside and/or outside one or more processors 2102 and 2202. Furthermore, one or more memories 2104 and 2204 may be connected to one or more processors 2102 and 2202 through various technologies such as wired or wireless connection.

One or more transceivers 2106 and 2206 may transmit to one or more other devices user data, control information, a wireless signal/channel, etc., mentioned in the methods and/or operation flowcharts of the present disclosure. One or more transceivers 2106 and 2206 may receive from one or more other devices user data, control information, a wireless signal/channel, etc., mentioned in the descriptions, functions, procedures, proposals, methods, and/or operation flowcharts disclosed in the present disclosure. For example, one or more transceivers 2106 and 2206 may be connected to one or more processors 2102 and 2202 and transmit and receive the radio signals. For example, one or more processors 2102 and 2202 may control one or more transceivers 2106 and 2206 to transmit the user data, the control information, or the radio signal to one or more other devices. Furthermore, one or more processors 2102 and 2202 may control one or more transceivers 2106 and 2206 to receive the user data, the control information, or the radio signal from one or more other devices. Furthermore, one or more transceivers 2106 and 2206 may be connected to one or more antennas 2108 and 2208 and one or more transceivers 2106 and 2206 may be configured to transmit and receive the user data, control information, wireless signal/channel, etc., mentioned in the descriptions, functions, procedures, proposals, methods, and/or operation flowcharts disclosed in the present disclosure through one or more antennas 2108 and 2208. In the present disclosure one or more antennas may be a plurality of physical antennas or a plurality of logical antennas (e.g., antenna ports). One or more transceivers 2106 and 2206 may convert the received radio signal/channel from an RF band signal to a baseband signal in order to process the received user data, control information, radio signal/channel, etc., by using one or more processors 2102 and 2202. One or more transceivers 2106 and 2206 may convert the user data, control information, radio signal/channel, etc., processed by using one or more processors 2102 and 2202, from the baseband signal into the RF band signal. To this end, one or more transceivers 2106 and 2206 may include an (analog) oscillator and/or filter.

Utilization Example of Wireless Device to Which Present Disclosure is Applied

FIG. 25 illustrates another example of a wireless device applied to the present disclosure. The wireless device may be implemented as various types according to a use example/service (see FIG. 23).

Referring to FIG. 25, wireless devices 2100 and 2200 may correspond to the wireless devices 2100 and 2200 of FIG. 24 and may be constituted by various elements, components, units, and/or modules. For example, the wireless devices 2100 and 2200 may include a communication unit 2110, a control unit 2120, and a memory unit 2130, and an additional element 2140. The communication unit may include a communication circuit 2112 and a transceiver(s) 2114. For example, the communication circuit 2112 may include one or more processors 2102.2202 and 2020 and/or one or more memories 2104.2204 and 2040 of FIG. 21. For example, the transceiver(s) 2114 may include one or more transceivers 2106.206 and 2060 and/or one or more antennas 2108.2208 and 2080 of FIG. 21. The control unit 2120 is electrically connected to the communication unit 2110, the memory unit 2130, and the additional element 2140 and controls an overall operation of the wireless device. For example, the control unit 2120 may an electrical/mechanical operation of the wireless device based on a program/code/instruction/information stored in the memory unit 2130. Furthermore, the control unit 2120 may transmit the information stored in the memory unit 2130 to the outside (e.g., other communication devices) through the communication unit 2110 via a wireless/wired interface or store, in the memory unit 2130, information received from the outside (e.g., other communication devices) through the wireless/wired interface through the communication unit 2110.

The additional element 2140 may be variously configured according to the type of wireless device. For example, the additional element 2140 may include at least one of a power unit/battery, an input/output (I/O) unit, a driving unit, and a computing unit. Although not limited thereto, the wireless device may be implemented as a form such as the robot 10000a of FIG. 23, the vehicles 10000b-1 and 10000b-2 of FIG. 23, the XR device 10000c of FIG. 23, the hand-held device 10000d of FIG. 23, the home appliance 10000e of FIG. 23, the IoT device 10000f of FIG. 23, a digital broadcasting terminal, a hologram device, a public safety device, an MTC device, a medical device, a fintech device (or financial device), a security device, a climate/environment device, an AI server/device 40000 of FIG. 23, the base station 20000 of FIG. 23, a network node, etc. The wireless device may be movable or may be used at a fixed place according to a use example/service.

In FIG. 25, all of various elements, components, units, and/or modules in the wireless devices 2100 and 2200 may be interconnected through the wired interface or at least may be wirelessly connected through the communication unit 2110. For example, the control unit 2120 and the communication unit 2110 in the wireless devices 2100 and 2200 may be wiredly connected and the control unit 2120 and the first unit (e.g., 2130 or 2140) may be wirelessly connected through the communication unit 2110. Further, each element, component, unit, and/or module in the wireless devices 2100 and 2200 may further include one or more elements. For example, the control unit 2120 may be constituted by one or more processor sets. For example, the control unit 2120 may be configured a set of a communication control processor, an application processor, an electronic control unit (ECU), a graphic processing processor, a memory control processor, etc. As another example, the memory 2130 may be configured as a random access memory (RAM), a dynamic RAM (DRAM), a read only memory (ROM), a flash memory, a volatile memory, a non-volatile memory, and/or combinations thereof.

Example of XR Device to Which Present Disclosure is Applied

FIG. 26 illustrates an XR device applied to the present disclosure. The XR device may be implemented as an HMD, a head-up display (HUD) provided in the vehicle, a television, a smartphone, a computer, a wearable device, a home appliance device, a digital signage, a vehicle, a robot, etc.

Referring to FIG. 26, an XR device 10000a may include a communication unit 2110, a control unit 2120, a memory unit 2130, an input/output unit 2140a, a sensor unit 2140b, and a power supply unit 2140c. Here, the blocks 2110 to 2130/2140a to 2140c correspond to the blocks 2110 to 2130/2140 of FIG. 25, respectively.

The communication unit 2110 may transmit/receive a signal (e.g., media data, a control signal, etc.) to/from external devices such as other wireless devices, hand-held devices, or media servers. The media data may include a video, an image, a sound, etc. The control unit 2120 may perform various operations by controlling components of the XR device 10000a. For example, the control unit 2120 may be configured to control and/or perform procedures such as video/image acquisition, (video/image) encoding, metadata generation and processing, etc. The memory unit 2130 may store data/parameters/programs/codes/instructions required for driving the XR device 10000a/generating the XR object. The input/output unit 2140a may output control information, data, etc., from the outside and output the generated XR object. The input/output unit 2140a may include a camera, a microphone, a user input unit, a display unit, a speaker, and/or a haptic module. The sensor unit 2140b may obtain an XR device state, surrounding environmental information, user information, etc. The sensor unit 2140b may include a proximity sensor, an illuminance sensor, an acceleration sensor, a magnetic sensor, a gyro sensor, an inertia sensor, an RGB sensor, an IR sensor, a fingerprint sensor, an ultrasonic sensor, an optical sensor, a microphone, and/or a radar. The power supply unit 2140c may supply power to the XR device 10000a and include a wired/wireless charging circuit, a battery, and the like.

As an example, the memory unit 2130 of the XR device 10000a may include information (e.g., data) required for generating the XR object (e.g., AR/VR/MR object). The input/output unit 2140a may acquire a command for operating the XR device 10000a from the user and the control unit 2120 may drive the XR device 10000*a* according to a driving command of the user. For example, when the user intends to watch a movie, news, etc., through the XR device 10000*a*, the control unit 2120 may transmit contents request information to another device (e.g., hand-held device 10000*d*) or the media server through the communication unit 2130. The communication unit 2130 may download/stream contents such as the movie, the news, etc., to the memory unit 2130, from another device (e.g., hand-held device 10000*d*) or the media server. The control unit 2120 may perform control and/or perform the procedures such as video/image acquisition, (video/image) encoding, metadata generation/processing, etc., for contents and generate/output the XR object based on a surrounding space or a reality object acquired through the input/output unit 2140*a*/the sensor unit 2140*b*.

Further, the XR device 10000*a* may be wirelessly connected to the hand-held device 10000*d* through the communication unit 2110 and the operation of the XR device 10000*a* may be controlled by the hand-held device 10000*d*. For example, the hand-held device 10000*d* may operate as a controller for the XR device 10000*a*. To this end, the XR device 10000*a* may acquire 3D positional information of the hand-held device 10000*d* and then generate and output the XR object corresponding to the hand-held device 10000*d*.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

The present disclosure is described based on an example applied to the 3GPP LTE/LTE-A/NR system, but the present invention may be applied to various wireless communication systems in addition to the 3GPP LTE/LTE-A/NR system.

The invention claimed is:

1. A method of reporting channel state information (CSI) in a coordinated multi-point (CoMP) system, the method performed by a terminal, comprising:
receiving discontinuous reception (DRX) configuration information from a first base station and a second base station;
receiving first configuration information related to a channel state information (CSI) report of a first bandwidth part (BWP) from the first base station and second configuration information related to a CSI report of a second BWP from the second base station,
wherein the first BWP is composed of a plurality of first subbands including at least one first subband for the CSI report,
wherein the second BWP is composed of a plurality of second subbands including at least one second subband for the CSI report, and
wherein the first configuration information and the second configuration information are received only during a specific time based on the DRX configuration information; and
based on that the at least one first subband and the at least one second subband partially or entirely overlap, obtaining a first CSI for the overlapped at least one subband of the first BWP and the second BWP; and
transmitting the first CSI to the first base station and the second base station;
obtaining a second CSI for subbands amongst the plurality of the first subbands except for the at least one first subband; and
transmitting the second CSI to the first base station.

2. The method of claim 1, wherein based on that the at least one first subband and the at least one second subband entirely overlap,
a size of the first BWP and a size of second BWP are the same, and
a size of the at least one first subband and a size of the at least one second subband are the same.

3. The method of claim 1, wherein based on that a size of the at least one first subband and a size of the at least one second subband are set differently for each other, the terminal recognizes that the first configuration information and the second configuration information are not valid.

4. The method of claim 1,
wherein the first configuration information includes a first size value for the plurality of first subbands, and
wherein the second configuration information includes a second size value for the plurality of second subbands.

5. The method of claim 4, wherein based on that the at least one first subband and the at least one second subband partially overlap, the at least one subband is calculated based on a smaller or larger value of the first size value and the second size value.

6. The method of claim 4, wherein based on that the at least one first subband and the at least one second subband partially overlap and the first size value is less than the second size value, the at least one subband is determined based on the at least one first subband or the at least one second subband.

7. The method of claim 1, further comprising:
obtaining a third CSI for subbands among the plurality of second subbands except for the at least one second subband; and
transmitting the third CSI to the second base station.

8. The method of claim 1, wherein the at least one first subband and the at least one second subband are indicated through a bitmap.

9. The method of claim 1,
wherein the first configuration information and the second configuration information are transmitted to the terminal based on a CoMP mode,
wherein the CoMP mode is indicated to the terminal through an explicit or implicit method, and
wherein in the implicit method, the terminal recognizes the CoMP mode based on that a specific condition is satisfied.

10. The method of claim 9, wherein the specific condition is a case that two or more DMRS (Demodulation Reference Signal) groups are set to the terminal from the first base station and the second base station, a case that a QCL (Quasi Co-Located) reference signal indicated by a Transmission Configuration Indicator (TCI) received from the first base station and the second base station is 2 or more, a case that some or all of active BWPs respectively set from the first base station and the second base station overlap, a case that some or all of reference signals (RS) for CSI measurement set in each of the active BWPs overlap in the frequency domain, or a case that some or all of the resource regions of a physical downlink shared channel (PDSCH) each received from the first base station and the second base station overlap.

11. A terminal reporting channel state information (CSI) in a coordinated multi-point (CoMP) system, comprising:
   a transceiver for transmitting and receiving a radio signal; and
   a processor functionally connected to the transceiver,
   wherein the processor is configured to:
      receive discontinuous reception (DRX) configuration information from a first base station and a second base station;
      receive first configuration information related to a channel state information (CSI) report of a first bandwidth part (BWP) from the first base station and second configuration information related to a CSI report of a second BWP from the second base station,
      wherein the first BWP is composed of a plurality of first subbands including at least one first subband for the CSI report,
      wherein the second BWP is composed of a plurality of second subbands including at least one second subband for the CSI report,
      wherein the first configuration information and the second configuration information are received only during a specific time based on the DRX configuration information; and
      based on that the at least one first subband and the at least one second subband partially or entirely overlap, obtain a first CSI for overlapping the overlapped at least one subband of the first BWP and the second BWP;
      transmit the first CSI to the first base station and the second base station;
      obtain a second CSI for subbands amongst the plurality of the first subbands except for the at least one first subband; and
      transmit the second CSI to the first base station.

12. The terminal of claim 11, wherein based on that the at least one first subband and the at least one second subband entirely overlap,
   the at least one subband is the at least one first subband or the at least one second subband,
   a size of the first BWP and a size of second BWP are the same,
   a size of the at least one first subband and a size of the at least one second subband are the same.

13. The terminal of claim 11, wherein based on that a size of the at least one first subband and a size of the at least one second subband are set differently for each other, the terminal recognizes that the first configuration information and the second configuration information are not valid.

14. The terminal of claim 11,
   wherein the first configuration information includes a first size value for the plurality of first subbands, and
   wherein the second configuration information includes a second size value for the plurality of second subbands.

15. The terminal of claim 14, wherein based on that the at least one first subband and the at least one second subband partially overlap, the at least one subband is calculated based on a smaller or larger value of the first size value and the second size value.

16. The terminal of claim 14, wherein based on that the at least one first subband and the at least one second subband partially overlap and the first size value is less than the second size value, the at least one subband is determined based on the at least one first subband or the at least one second subband.

17. The terminal of claim 11, further comprising:
   obtain a third CSI for subbands among the plurality of second subbands except for the at least one second subband; and
   transmit the third CSI to the second base station.

18. The terminal of claim 11, wherein the at least one first subband and the at least one second subband are indicated through a bitmap.

* * * * *